(12) United States Patent
Hozumi et al.

(10) Patent No.: US 7,787,031 B2
(45) Date of Patent: Aug. 31, 2010

(54) IMAGE-PICKUP APPARATUS FOR DUST PREVENTION

(75) Inventors: Yasushi Hozumi, Ageo (JP); Goro Noto, Tokyo (JP); Isami Itoh, Mishima (JP)

(73) Assignee: Canon Kabushiki Kaisha (JP)

( * ) Notice: Subject to any disclaimer, the term of this patent is extended or adjusted under 35 U.S.C. 154(b) by 355 days.

(21) Appl. No.: 11/733,313

(22) Filed: Apr. 10, 2007

(65) Prior Publication Data

US 2007/0247543 A1    Oct. 25, 2007

(30) Foreign Application Priority Data

Apr. 11, 2006   (JP) ............... 2006-108860
Apr. 11, 2006   (JP) ............... 2006-108861

(51) Int. Cl.
*H04N 5/217* (2006.01)

(52) U.S. Cl. .................... 348/241; 348/360

(58) Field of Classification Search .... 348/207.99–369; 359/290
See application file for complete search history.

(56) References Cited

U.S. PATENT DOCUMENTS

| | | | | |
|---|---|---|---|---|
| 3,562,414 A * | 2/1971 | Blum | .......................... | 348/795 |
| 4,063,281 A * | 12/1977 | Kornreich et al. | ........... | 382/280 |
| 4,670,083 A * | 6/1987 | Membrino | .................. | 156/510 |
| 5,969,757 A * | 10/1999 | Okada et al. | ............. | 348/219.1 |
| 6,094,294 A * | 7/2000 | Yokoyama et al. | .......... | 359/290 |
| 6,188,530 B1 * | 2/2001 | Katsuragi | .................... | 359/824 |
| 7,233,359 B2 * | 6/2007 | Suda | ......................... | 348/349 |
| 7,324,149 B2 * | 1/2008 | Takizawa et al. | ............ | 348/340 |
| 7,412,157 B2 * | 8/2008 | Park et al. | ..................... | 396/79 |
| 7,463,301 B2 * | 12/2008 | Shimizu | ..................... | 348/335 |
| 2002/0039376 A1 * | 4/2002 | Kim et al. | ..................... | 372/50 |
| 2002/0102102 A1 * | 8/2002 | Watanabe et al. | ............. | 396/89 |
| 2003/0202114 A1 * | 10/2003 | Takizawa et al. | ............ | 348/335 |
| 2004/0130639 A1 * | 7/2004 | Koga et al. | ................... | 348/294 |
| 2004/0227845 A1 * | 11/2004 | Kawai | ......................... | 348/360 |
| 2004/0263669 A1 * | 12/2004 | Kobayashi | .................. | 348/340 |
| 2005/0099527 A1 * | 5/2005 | Fujii | .......................... | 348/360 |
| 2005/0280712 A1 * | 12/2005 | Kawai | .................... | 348/207.99 |
| 2007/0086718 A1 * | 4/2007 | Aoki et al. | .................. | 385/132 |
| 2008/0018775 A1 * | 1/2008 | Inukai | ........................ | 348/340 |

FOREIGN PATENT DOCUMENTS

| | | |
|---|---|---|
| JP | 2002-204379 A | 7/2002 |
| JP | 2003-005254 A | 1/2003 |
| JP | 2004-032191 A | 1/2004 |

* cited by examiner

*Primary Examiner*—John M Villecco
*Assistant Examiner*—Kent Wang
(74) *Attorney, Agent, or Firm*—Rossi, Kimms & McDowell LLP

(57) ABSTRACT

An optical filter which can remove dust stuck to the incidence surface of incidence of light and reduce the mounting space. A filter body is adapted to have predetermined transmittivity as well as a piezoelectric characteristic. At least two electrodes are formed on the filter body. A drive voltage is applied between the at least two electrodes to vibrate the filter body.

11 Claims, 20 Drawing Sheets

IMAGE-PICKUP APPARATUS FOR DUST PREVENTION

BACKGROUND OF THE INVENTION

1. Field of the Invention

The present invention relates to an optical filter used for an image-pickup device and an image-pickup apparatus using the image-pickup device.

2. Description of the Related Art

A single lens reflex type digital camera provided with a finder apparatus and a lens which is a photographic optical system replaceable for the camera body is being commercialized in recent years. With this digital camera, a user mounts desired lenses in the camera body, and can thereby selectively use a plurality of types of lenses for the single camera body. Furthermore, the camera body incorporates various mechanical mechanisms such as a shutter mechanism and a diaphragm mechanism.

In such a single-lens reflex digital camera whose lens is replaceable, dust may enter the camera body from outside when the lens is removed from the camera body. Furthermore, through operations of the various mechanical mechanisms, dust such as abrasion powder may be produced from members making up the mechanisms. When such dust is stuck to, for example, the image-pickup surface of an image-pickup element or the surface of an optical member (cover member) disposed in front thereof, images or so-called shadows of dust may be imaged onto an image captured by the digital camera, which may cause image quality to degrade.

Therefore, there is a proposal of a first conventional technique for providing a dust-proofing member for sealing and protecting the image-pickup surface of an image-pickup element, vibrating the dust-proofing member using a vibration device and thereby removing dust or the like stuck to the surface of this dust-proofing member (see e.g., Japanese Laid-Open Patent Publication (Kokai) No. 2002-204379).

Furthermore, when dust enters a space between the cover member of the image-pickup element and an optical filter arranged in front of the cover member, the digital camera needs to be disassembled to remove the dust. For this reason, a dust-proofing structure is conventionally provided which prevents dust from entering the space by blocking off the space between the cover member of the image-pickup element and the optical filter.

However, the above described dust-proofing structure is intended to prevent dust from entering the space between the cover member of the image-pickup element and the optical filter, and not intended to prevent dust from sticking to the incidence surface of the optical filter (hereinafter referred to as "the surface of the optical filter"). Therefore, dust may sometimes stick to the surface of the optical filter. Here, when the optical filter is arranged in the vicinity of the position of a focal plane, images of the dust stuck to the surface thereof is imaged onto the image-pickup device as shadows, thus causing degradation of image quality.

Furthermore, there is also a proposal of a structure whereby the surface of the cover member of the image-pickup element or the surface of the optical filter is cleaned with a wiper (see e.g., Japanese Laid-Open Patent Publication (Kokai) No. 2003-005254). This makes it possible to remove dust stuck to the surface of the cover member of the image-pickup element or the surface of the optical filter without removing the lens and without disassembling the digital camera.

However, dust stuck to the surface of the cover member of the image-pickup element or the surface of the optical filter may be sometimes hard like metallic powder. In this case, when the wiper slides along the surface of the cover member or the surface of the optical filter, this dust may damage the surface of the cover member or the surface of the optical filter.

Therefore, a configuration whereby the cover member or the optical filter is vibrated to remove dust stuck to the surface without damaging the surface of the cover member of the image-pickup element or the surface of the optical filter is proposed as a second conventional technique (see, e.g., Japanese Laid-Open Patent Publication (Kokai) No. 2004-032191). That is, this configuration is intended to vibrate the cover member or the optical filter using a vibration device and remove dust stuck to the surface thereof through vibration of the cover member or the optical filter.

However, adopting the above described mechanism (dust removing mechanism) which removes dust stuck to the surface of the dust-proofing member in a single-lens reflex digital camera according to the above described first conventional technique results in an addition of many mechanical parts. This is not desirable for a single-lens reflex digital camera whose size is required to be decreased from the standpoint of mounting space.

Furthermore, since the above described dust removing mechanism is arranged between the shutter mechanism and the image-pickup device, a space required for the mounting of the dust removing mechanism must be reserved between the shutter mechanism and the image-pickup device and the distance between the shutter mechanism and the image-pickup device needs to be extended more than the distance necessary for an image-pickup process. However, it is preferable to make the distance between the shutter mechanism and the image-pickup device as short as possible from the standpoint of the shutter efficiency. Therefore, when the above described dust removing mechanism is added to the digital camera, the distance between the shutter mechanism and the image-pickup device is necessarily extended and the shutter efficiency degrades.

Furthermore, when the vibration device according to the above described second conventional technique vibrates the cover member or the optical filter, vibration of the cover member of the image-pickup element or the optical filter propagates to the member which fixes the cover member or the optical filter. As a result, there is a possibility that the cover member of the image-pickup element or the optical filter may be detached from the member which fixes the cover member or the optical filter.

SUMMARY OF THE INVENTION

It is a first object of the present invention to provide an optical filter which can remove dust stuck to the incidence surface and reduce the mounting space.

It is a second object of the present invention to provide an image-pickup apparatus which can remove dust which can lead to image shadows onto a captured image without degrading the shutter efficiency.

It is a third object of the present invention to provide an image-pickup apparatus which can remove dust stuck to the surface without damaging the surface of the optical member or the surface of the cover member of the image-pickup element and eliminate the possibility that the optical member or the cover member may be detached from the member which fixes the optical member or the cover member.

In a first aspect of the present invention, there is provided an optical filter comprising a filter body adapted to have predetermined transmittivity as well as a piezoelectric characteristic, and at least two electrodes formed on the filter body, wherein a drive voltage is applied between the at least two electrodes to vibrate the filter body.

In a second aspect of the present invention, there is provided an optical filter comprising a filter body adapted to have predetermined transmittivity, a piezoelectric member adapted to have transmittivity superimposed on and connected to an incidence surface of the filter body, and at least two electrodes formed on the piezoelectric member, wherein a drive voltage for vibrating the piezoelectric member is applied between the at least two electrodes.

In a third aspect of the present invention, there is provided an optical filter comprising a filter body adapted to have predetermined transmittivity, a piezoelectric member adapted to have transmittivity superimposed on and connected to an incidence surface of the filter body, and a transducer formed on the piezoelectric member adapted to excite a surface acoustic wave on the incidence surface of the piezoelectric member with an application of a drive voltage.

According to the optical filter of the present invention, dust stuck to the incidence surface can be removed and the mounting space can be reduced.

In a fourth aspect of the present invention, there is provided an image-pickup apparatus comprising an image-pickup element, and an optical filter arranged on the side of an incidence surface of the image-pickup element, wherein a space formed between the image-pickup element and the optical filter is composed so as to be blocked off from outside, the optical filter is made up of the optical filter as claimed in any one of claims 1, 2, and 4, and the optical filter is provided with a drive voltage application device adapted to apply a drive voltage for vibrating the optical filter or a drive voltage for exciting a surface acoustic wave on the incidence surface of the optical filter According to the image-pickup apparatus of the present invention, it is possible to remove dust which can lead to image shadows onto the image captured without reducing shutter efficiency.

In a fifth aspect of the present invention, there is provided an image-pickup apparatus comprising an image-pickup device adapted to convert light from an object to an electric signal, an optical member arranged ahead of the image-pickup device at a distance from the image-pickup device, and a sealing device adapted to block off a space formed between the image-pickup device and the optical member from outside, wherein the optical member is made up of a piezoelectric member adapted to have transmittivity and an electrode is formed on the surface of the optical member on the object side for exciting a surface acoustic wave on the surface of the optical member on the object side with the application of a drive voltage.

In a sixth aspect of the present invention, there is provided an image-pickup apparatus comprising a substrate adapted to have a cover member which allows light from an object to pass and constitute a housing space blocked off from outside, and an image-pickup element housed in a housing space of the substrate, adapted to convert light which has passed through the cover member to an electric signal, wherein the cover member is made up of a piezoelectric member which is adapted to have transmittivity and an electrode is formed on the surface of the cover member on the object side for exciting a surface acoustic wave on the surface of the cover member on the object side with the application of a drive voltage.

In a seventh aspect of the present invention, there is provided an image-pickup apparatus comprising a substrate adapted to have a cover member which allows light from an object to pass and constitute a housing space blocked off from outside, an image-pickup element housed in a housing space of the substrate, adapted to convert light which has passed through the cover member to an electric signal, an optical member adapted to have a piezoelectric characteristic, and pasted onto the surface of the cover member on the object side, and an electrode formed on the surface of the optical member on the object side for exciting a surface acoustic wave on the surface of the optical member on the object side with the application of a drive voltage.

According to the image-pickup apparatus of the present invention, dust which can lead to image shadows onto a captured image can be removed without degrading the shutter efficiency.

According to the present invention, dust stuck to the surface of the optical member or the surface of the cover member of the image-pickup element can be removed without damaging the surfaces, eliminating the possibility that the optical member or the cover member may be detached from the member which fixes the optical member or the cover member.

Further features and aspects of the present invention will become apparent from the following detailed description of exemplary embodiments with reference to the attached drawings.

BRIEF DESCRIPTION OF THE DRAWINGS

FIG. 5A is a diagram showing a resist application process, FIG. 5B is a diagram showing an electrode pattern forming process and FIG. 5C is a diagram showing an etching process.

DETAILED DESCRIPTION OF THE PREFERRED EMBODIMENTS

The following description of exemplary embodiments, features and aspects of the present invention is merely illustrative in nature and is in no way intended to limit the invention, its application, or uses.

Hereinafter, embodiments of the present invention will be explained with reference to the attached drawings.

First Embodiment

Figure 1:
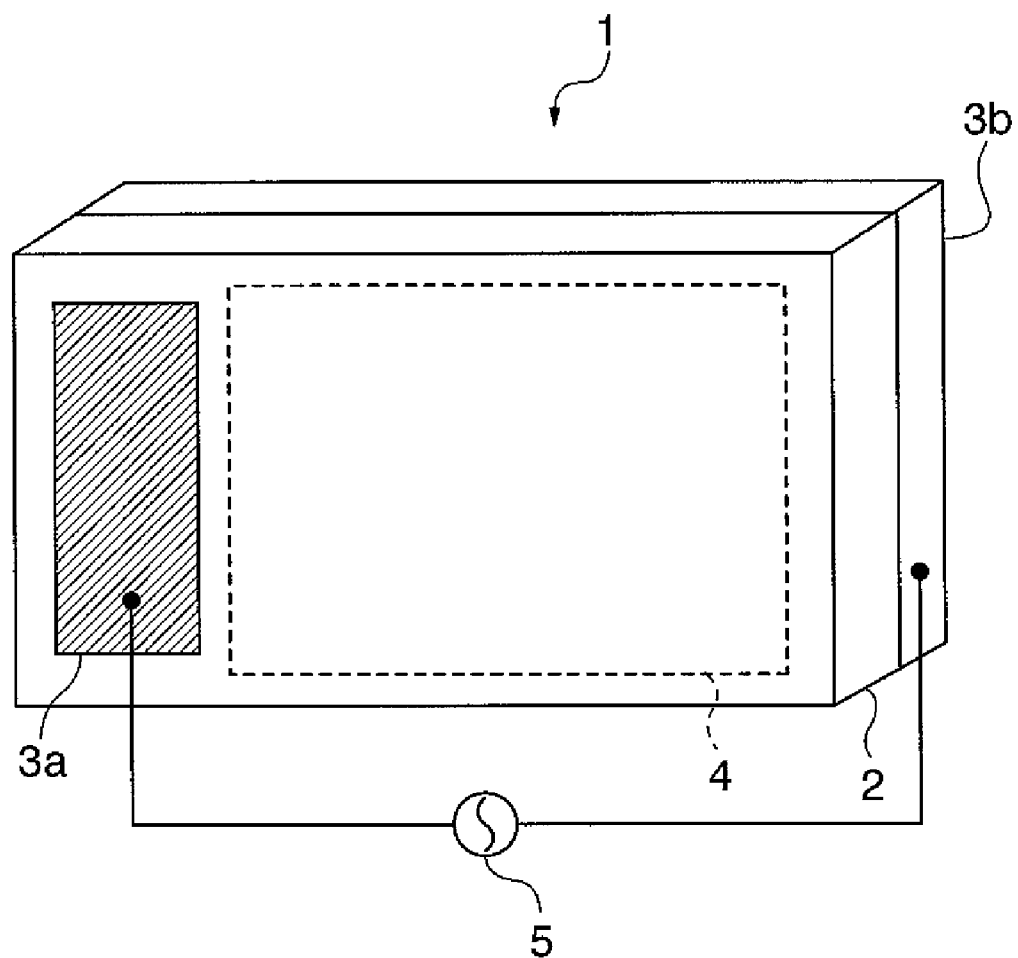
FIG. 1 is a perspective view showing the configuration of an optical filter according to a first embodiment of the present invention.
Figure 2:
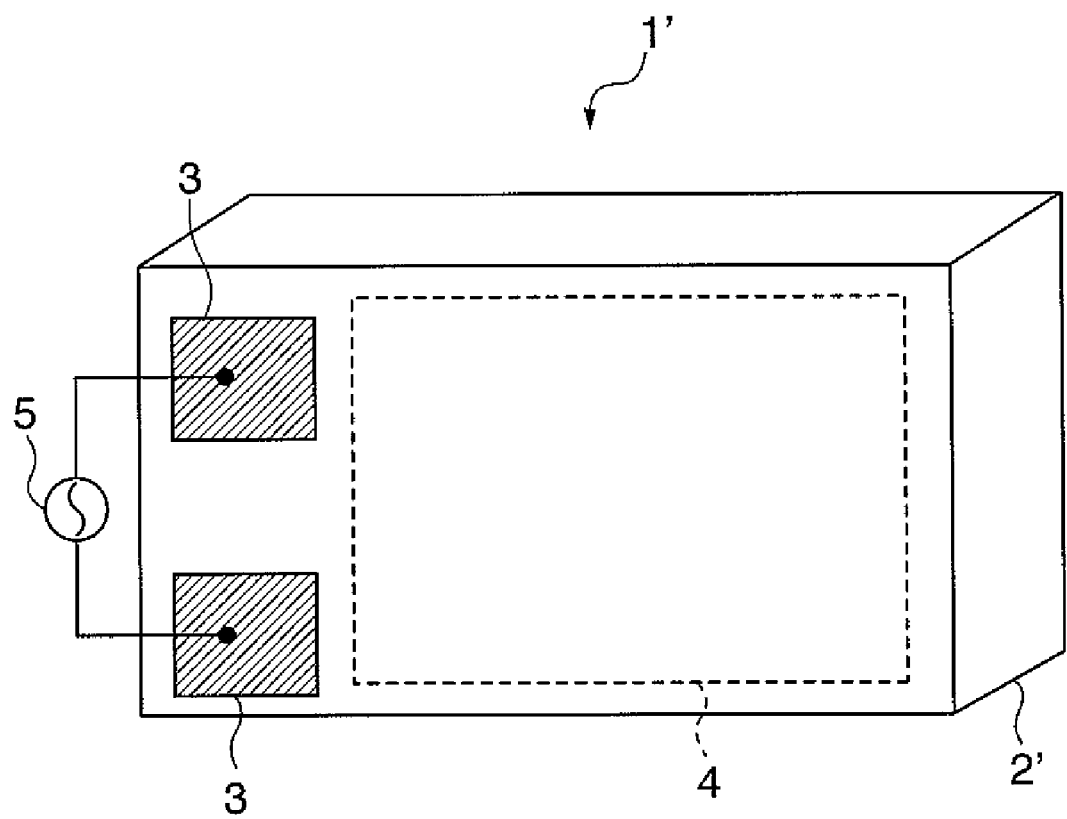
FIG. 2 is a perspective view showing a variation of the configuration of the optical filter in FIG. 1.

FIG. 1 is a perspective view showing the configuration of an optical filter according to a first embodiment of the present invention. FIG. 2 is a perspective view showing a variation of the configuration of the optical filter in FIG. 1.

The optical filter 1 is provided with a rectangular flat-shaped filter body 2 as shown in FIG. 1. The filter body 2 has predetermined transmittivity and is made of a member having a piezoelectric characteristic. This filter body 2 is made of, for example, crystal. Furthermore, the transmittivity of the filter body 2 can be made to have a predetermined cutoff wavelength with respect to incident light, for example. This filter body 2 specifies an effective area 4 for receiving effective light of the incident light, which is in a band not subject to transmission limitation by the filter body 2.

An electrode 3a is formed on one of the surfaces (incidence surface) of the filter body 2 and the electrode 3a is arranged outside the effective area 4 so as not to interfere with the effective area 4. Furthermore, a transparent electrode 3b is formed on the other surface of the filter body 2. The transparent electrode 3b has a rectangular flat-shaped surface that covers the other surface of the filter body 2 and is made of a material having transmittivity at least in a visible light area. Furthermore, a power circuit 5 which can apply an AC voltage is connected between the electrode 3a and transparent electrode 3b.

When an AC voltage is applied from the power circuit 5 between the electrode 3a and transparent electrode 3b, the electric polarization condition of the filter body 2 changes so as to follow the polarity of the applied AC voltage and the filter body 2 vibrates due to a piezoelectric characteristic thereof. This vibration causes dust stuck to the one of the surfaces (incidence surface) of the filter body 2 to be removed.

FIG. 2 is a perspective view showing a variation of the configuration of the optical filter in FIG. 1. In the case of an optical filter 1' shown in FIG. 2, two electrodes 3 are provided on one of the surfaces (incidence surface) of a rectangular flat-shaped filter body 2'. The respective electrodes 3 are arranged outside the effective area 4 so as not to interfere with the effective area 4 and the power circuit 5 which can apply an AC voltage is connected between the electrodes 3. In this way, when an AC voltage is applied between the electrodes 3 from the power circuit 5, the filter body 21 is vibrated and dust on the surface of filter body 21 is removed.

Here, crystal is used as the material making up the filter bodies 2 and 2' in this embodiment. However, because the electromechanical coupling coefficient of crystal is small, the filter bodies 2 and 2' cannot obtain strong vibration. Therefore, from the standpoint of dust removing efficiency, it is not effective to directly form electrodes in the filter bodies 2 and 2' made of crystal and vibrate these filter bodies 2 and 2' like this embodiment. In other words, adopting the configuration of this embodiment is effective when removing dust having a relatively small sticking force from the filter bodies 2 and 2', which does not require strong vibration.

Second Embodiment

Figure 3:
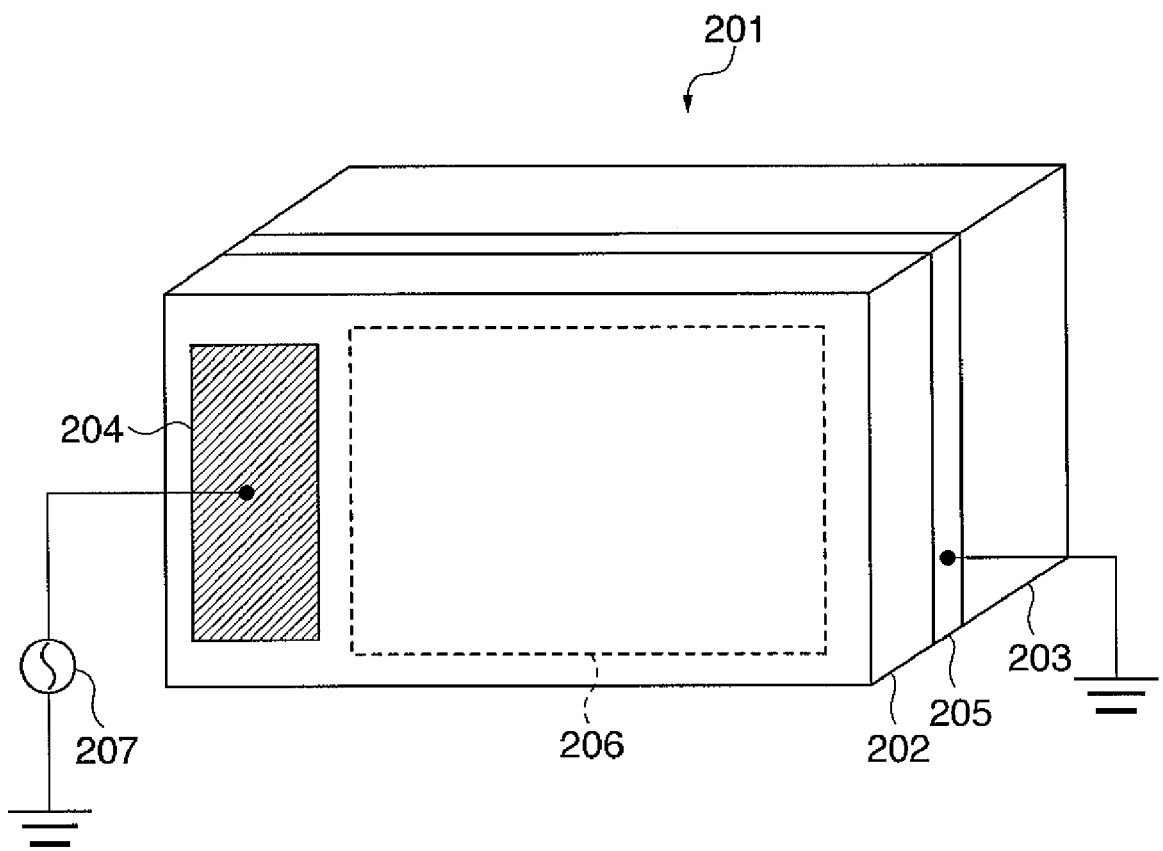
FIG. 3 is a perspective view showing the configuration of an optical filter according to a second embodiment of the present invention.

Next, a second embodiment of the present invention will be explained with reference to FIG. 3. FIG. 3 is a perspective view showing the configuration of an optical filter according to the second embodiment of the present invention.

This embodiment provides an optical filter having higher dust removing efficiency than that of the optical filter 2 (or 2') of the above described first embodiment. In this optical filter, a piezoelectric member having light transmittivity and birefringence and further having a considerably larger electromechanical coupling coefficient than crystal is connected to the incidence surface of the filter body. An electrode is formed on each surface of this piezoelectric member and an AC voltage is applied between the respective electrodes. When an AC voltage is applied between the respective electrodes in this configuration, the piezoelectric member is excited and can remove dust stuck to the surface of the piezoelectric member with high efficiency.

More specifically, as shown in FIG. 3, an optical filter 201 is provided with a filter body 203 having light transmittivity and birefringence. A large rectangular flat-shaped piezoelectric member 202 is connected to one of the surfaces (incidence surface) of the filter body 203 through a transparent electrode 205. The piezoelectric member 202 has a large electromechanical coupling coefficient and has transmittivity and birefringence. An effective area 206 for receiving light from an object is specified in the piezoelectric member 202.

An electrode 204 is formed on one of the surfaces (incidence surface) of the piezoelectric member 202. This electrode 204 is arranged outside the effective area 206 so as not to interfere with the effective area 206. Furthermore, the transparent electrode 205 formed on the other surface (surface opposed to the filter body 203) of the piezoelectric member 202 is formed so as to cover the other surface. This transparent electrode 205 is grounded.

Furthermore, a power circuit 207 which can apply an AC voltage is connected between the electrode 204 and the transparent electrode 205. In this way, when an AC voltage is applied between the electrode 204 and the transparent electrode 205 from the power circuit 207, the electric polarization condition of the piezoelectric member 202 changes so as to follow the polarity of the applied AC voltage and the piezoelectric member 202 vibrates due to a piezoelectric characteristic thereof. Through this vibration, it is possible to remove dust stuck to one of the surfaces (incidence surface) of the piezoelectric member 202.

In this embodiment, $LiNbO_3$ having a thickness of 0.4 mm is used as a component of the piezoelectric member 202. ITO having a thickness of 0.1 mm is used as a component of the transparent electrode 205. Crystal having a thickness of 2.54 mm is used as a component of the filter body 203. In the case of this configuration, the separation width between an ordinary ray and an extraordinary ray is approximately 15 μm.

Here, the filter body 203 is made of crystal, but instead of this, it is possible to use a member that has transmittivity to allow light in the visible area to pass and produces a difference in a refractive index between the ordinary ray and extraordinary ray as the component of the filter body 203. For example, $LiNbO_3$ or the like can be used. Therefore, the piezoelectric member 202 and the filter body 203 can be composed of one member of $LiNbO_3$. In this case, the optical filter can be composed of one flat-shaped member which has a dual-function as the piezoelectric member 202 and the filter body 203, a transparent electrode 204 formed on one of the surfaces of this flat-shaped member and a transparent electrode 205 formed on the other surface of this flat-shaped member. As a result, an optical filter in a simplified structure can be obtained.

Furthermore, when only the filter body 203 is provided with the function as the optical filter, the piezoelectric member 202 can also be composed of a piezoelectric material (e.g., ZnO) which has no birefringence but has light transmittivity in the visible light area.

Third Embodiment

Figure 4:
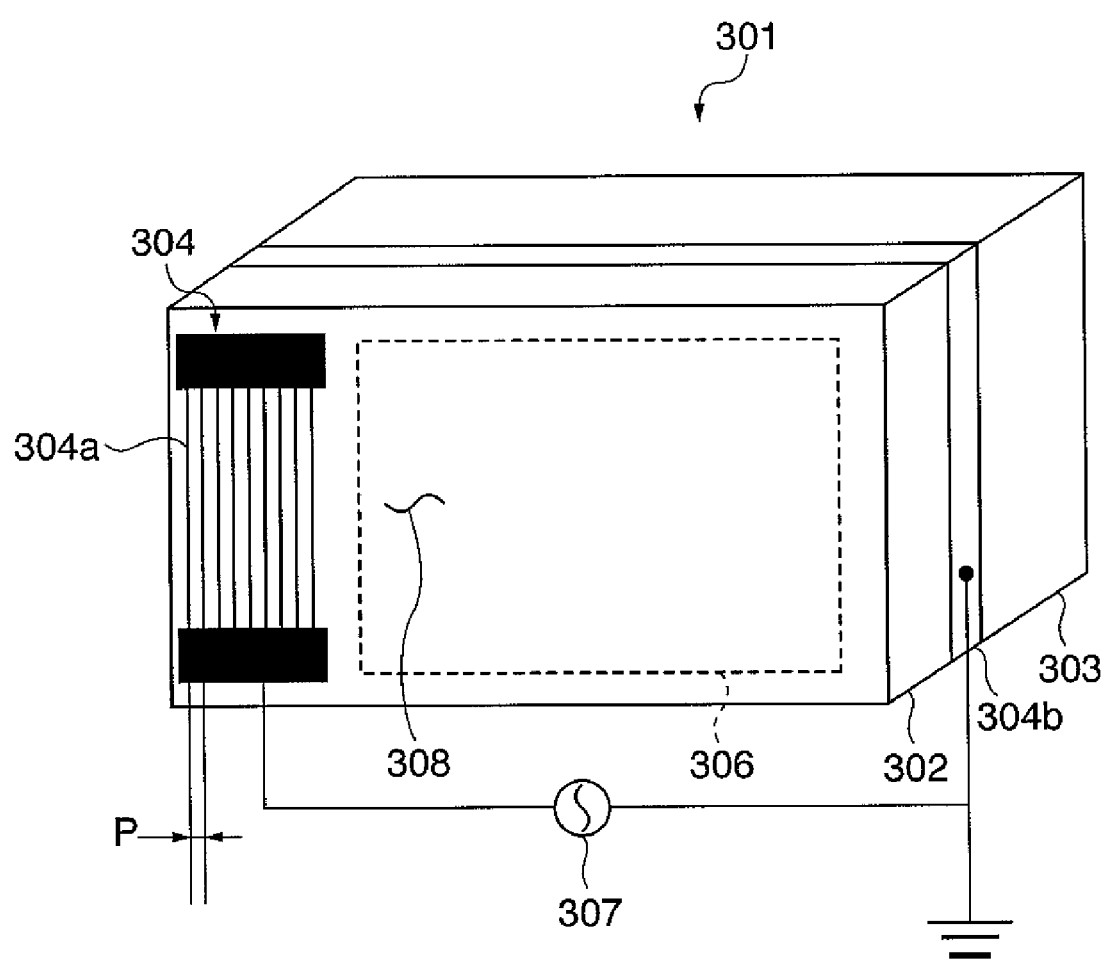
FIG. 4 is a perspective view showing the configuration of an optical filter according to a third embodiment of the present invention.
Figure 5A:
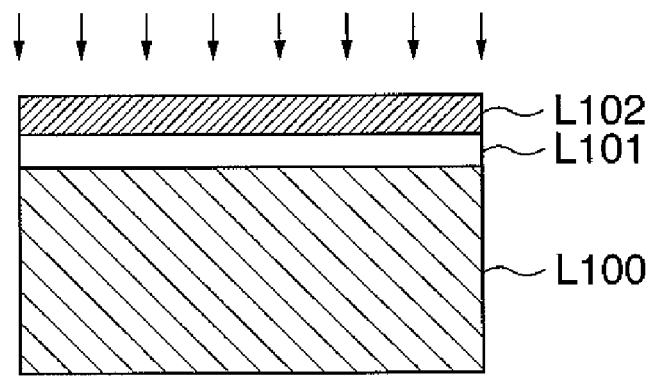
FIG. 5A to FIG. 5C are diagrams schematically showing a method of forming a ladder shaped electrode in FIG. 4.
Figure 5B:
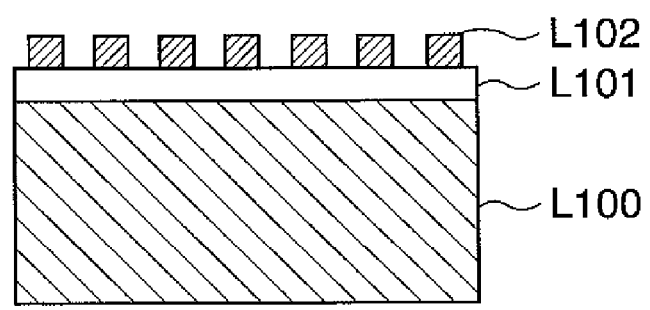
Figure 5C:
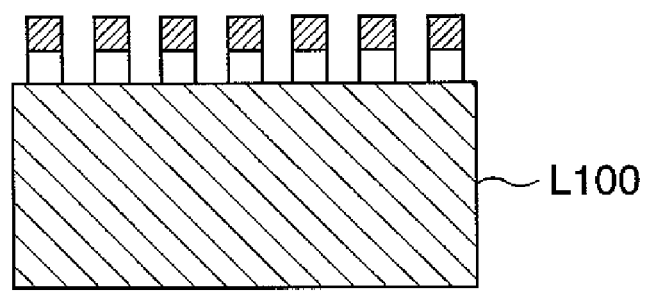
Figure 6:
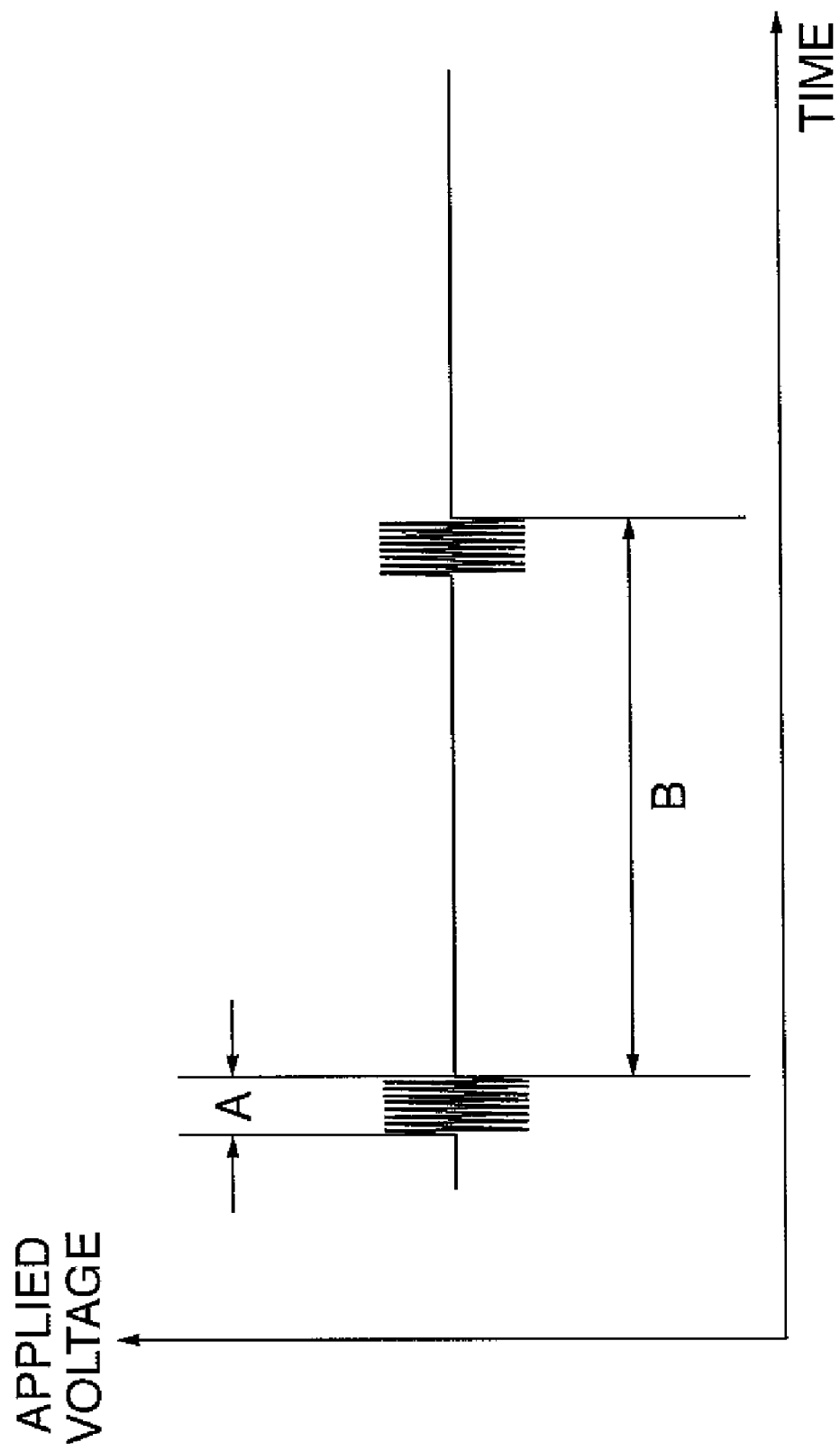
FIG. 6 is a waveform diagram of an AC voltage applied from a power circuit in FIG. 4.
Figure 7:
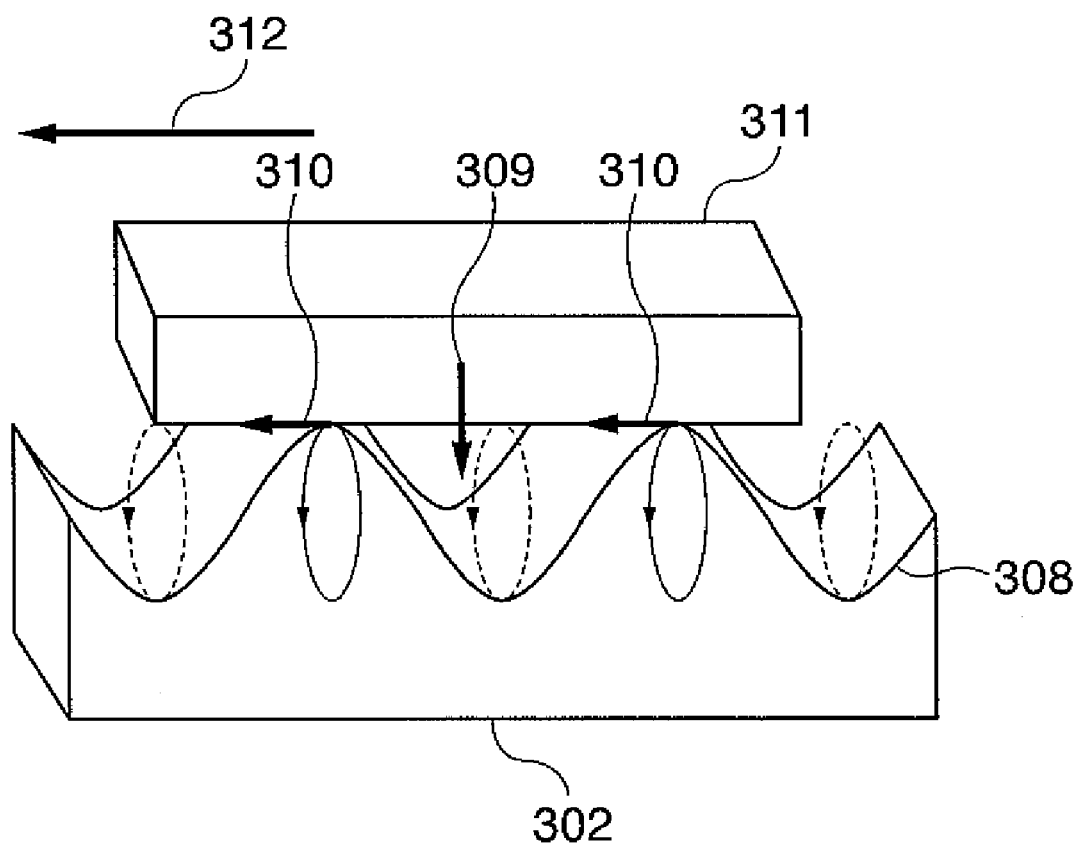
FIG. 7 is a perspective view schematically showing how dust is transferred by a surface acoustic wave excited on the surface of a piezoelectric member in FIG. 4.

Next, a third embodiment of the present invention will be explained with reference to FIG. 4 to FIG. 7. FIG. 4 is a perspective view showing the configuration of an optical filter according to the third embodiment of the present invention. FIG. 5A to FIG. 5C are diagrams schematically showing a method of forming a ladder shaped electrode in FIG. 4. FIG. 5A is a diagram showing a resist application process, FIG. 5B is a diagram showing an electrode pattern forming process and FIG. 5C is a diagram showing an etching process. FIG. 6 is a waveform diagram of an AC voltage applied from a power circuit in FIG. 4. FIG. 7 is a perspective view schematically showing how dust is transferred by a surface acoustic wave excited on the surface of a piezoelectric member in FIG. 4.

This embodiment provides an optical filter whereby only the incidence surface thereof along which a surface acoustic wave propagates is vibrated by forming a transducer to excite the surface acoustic wave on the incidence surface. When the thickness of the optical filter is sufficiently large with respect to the wavelength of the surface acoustic wave, the surface opposite to the incidence surface never vibrates. This eliminates unnecessary vibration at a joint between the optical filter and other member (e.g., image-pickup element), and further allows the optical filter and other member to be connected together in a simple structure. Furthermore, the structure of blocking off the space formed between the optical filter and the other member (e.g., image-pickup element) from outside can be simplified through simplification of this connection structure.

There are two kinds of methods of exciting a surface acoustic wave on the optical filter; indirect excitation method and direct excitation method. The indirect excitation method is an excitation method which gives vibration of a vertical vibrator or transversal vibrator to the surface of an optical filter through grease or the like. Examples of this indirect excitation method include a method using a cuneiform transducer or the like. However, the indirect excitation requires a coupler for elastically coupling the vibrators and the optical filter through which a surface acoustic wave propagates, which results in a disadvantage that the size of the structure increases or the like.

On the other hand, the direct excitation method is a method whereby the optical filter is provided with positive and negative electrodes to directly excite a surface acoustic wave with an electric field which penetrates the interior of a piezoelectric optical filter. Forming the electrodes on the optical filter using a photoetching method or the like allows a transducer to be manufactured relatively easily and also manufactured in a smaller size.

Therefore, an optical filter using the direct excitation method is preferable as the optical filter suitable for a portable device which is required to be downsized. Examples of this type of optical filter include an optical filter provided with a transducer such as a single-phase electrode transducer or an interdigital transducer (IDT). In this embodiment, an optical filter provided with a single-phase electrode transducer will be explained.

More specifically, as shown in FIG. 4, an optical filter 301 of this embodiment is provided with a filter body 303 having light transmittivity and birefringence. A rectangular flat-shaped piezoelectric member 302 is connected to one of the surfaces (incidence surface) of the filter body 303 through a transparent electrode 304b. The piezoelectric member 302 has a large electromechanical coupling coefficient, and has transmittivity and birefringence. An effective area 306 for receiving light from an object is specified in the piezoelectric member 302.

A single-phase electrode transducer 304 is formed in the piezoelectric member 302. This single-phase electrode transducer 304 includes a ladder shaped electrode 304a and the above described transparent electrode 304b. The ladder shaped electrode 304a is formed on one of the surfaces (incidence surface) of the piezoelectric member 302 and arranged so as not to interfere with the effective area 306. Furthermore, the transparent electrode 304b is formed on the other surface (surface opposed to the filter body 303) of the piezoelectric member 302 and has a flat shape so as to cover the other surface of the piezoelectric member 302. The transparent electrode 304b is grounded.

Furthermore, a power circuit 307 which can apply an AC voltage is connected between the ladder shaped electrode 304a and the transparent electrode 304b. In this way, when an AC voltage is applied between the ladder shaped electrode 304a and the transparent electrode 304b from the power circuit 307, a surface acoustic wave 308 is excited along one of the surfaces (incidence surface) of the piezoelectric member 302.

In this embodiment, $LiNbO_3$ having a thickness of 0.4 mm is used as the piezoelectric member 302. Furthermore, ITO having a thickness of 0.1 mm is used as the transparent electrode 304b. Furthermore, crystal having a thickness of 2.54 mm is used as the filter body 303. In the case of this configuration, the separation width between an ordinary ray and an extraordinary ray is approximately 15 μm.

Furthermore, assuming that the propagation speed of the surface acoustic wave 308 on the piezoelectric member 302 is V, the frequency of the AC voltage applied by the power circuit 307 is f and the pitch between the electrodes of the ladder shaped electrode 304a is P, this pitch P is set according to following Expression (1).

$$P = V/f \qquad (1)$$

For example, when the propagation speed V of the surface acoustic wave is 4000 m/sec, the frequency f of the AC voltage is 50 MHz, if the pitch P between the electrodes forming the electrode 304 is set to 80 μm according to above described Expression (1), the surface acoustic wave 308 is excited most strongly.

The above described ladder shaped electrode 304a can be formed using, for example, a photoetching method. According to this photoetching method, an original picture is reduced in one or two steps using a lens having small aberration and a photomask is thereby formed. This photomask is held in close contact with or with a gap of several μm from the surface of the substrate to which a positive or negative resist is applied. Next, the surface of the substrate is exposed to light using a light source such as a high-pressure mercury light using this photomask and an electrode pattern corresponding to the photomask is formed on the surface of the substrate.

More specifically, when the negative resist is used, a metal L101 such as aluminum is vapor-deposited on the piezoelectric member L100 as shown in FIG. 5A and a resist L102 is applied onto this metal L101 using a spin coater. Next, exposure and developing are performed using a photomask (not shown). In this way, an electrode pattern is formed in the resist L102 as shown in FIG. 5B. In this stage, the resist L102 in the area where electrodes are formed remains and there is no resist in other areas. Next, as shown in FIG. 5C, the metal (aluminum) in the area where no resist remains (area where no electrode is formed) is removed using a NaOH or phosphoric acid based etching liquid. The resist of the metallic part remaining on the piezoelectric member L100 is removed using a resist removing liquid. Through these processes, the ladder shaped electrode 304a is finally formed.

The application of a voltage to the single-phase electrode transducer 304 from the power circuit 307 is performed repeatedly at intervals of time period B as shown in FIG. 6 for a predetermined time period. That is, the AC voltage is applied from the power circuit 307 repeatedly on a periodical basis for the predetermined time period. Here, the duration of AC voltage application at a time is set to time period A. In this embodiment, time period A is set to 20 μsec and time period B is set to 200 μsec. The predetermined time period for which the above described AC voltage is applied repeatedly on a periodical basis is set to, for example, 15 seconds or more. Furthermore, when heat generation of the piezoelectric member 302 or the like needs to be suppressed, time period A may be set shorter and time period B may be set longer.

Here, the size of dust that can be removed is at least a propagation wavelength V/f or greater. Therefore, as the frequency f of the AC voltage increases, the size of eliminable dust can be reduced. On the other hand, when Vp-p of the AC voltage is kept constant, the amplitude of the excited surface acoustic wave 308 decreases gradually as the frequency f of the AC voltage is increased. That is, when the frequency f of the AC voltage is increased to such a degree that the amplitude of the surface acoustic wave 308 reaches the degree of surface roughness of the piezoelectric member 302, the removal of dust contrarily becomes more difficult and the removal rate declines.

Therefore, when an AC voltage with a high frequency f is used, the above described method of periodically applying the AC voltage makes it easier to further increase Vp-p of the AC voltage and has a great effect on the removal of smaller dust.

When the above described AC voltage is applied from the power circuit 307 to the above described single-phase electrode transducer 304 (between the ladder shaped electrode 304a and transparent electrode 304b), the surface acoustic wave 308 is excited only along the surface (incidence surface) of the piezoelectric member 302 as shown in FIG. 7 and the propagating part of the surface acoustic wave 308 performs ellipsoidal motion. Here, a preload 309 such as the own weight due to gravity of dust 311 stuck to this surface and an electrostatic force acts on the surface of piezoelectric member 302. At this time, due to the ellipsoidal motion of the propagating part of the surface acoustic wave 308 and the above described preload 309, a frictional force 310 acts on the stuck dust 311 and this causes the stuck dust 311 to move in a direction indicated by an arrow 312 (direction toward the ladder shaped electrode 304a in FIG. 4) in FIG. 7. When the above described AC voltage is applied for the predetermined time period (for example, a period of equal to or more than 15 seconds), the dust 311 on the surface of the piezoelectric member 302 is removed.

Furthermore, since the frequency f of the AC voltage is equal to or more than several MHz, noise offensive to the ear is never produced and excellent quietness is obtained.

Next, an experimental method to confirm the dust removal effect using the above described optical filter 301 and the result thereof will be explained. Here, as the dust stuck to the incidence surface (surface of piezoelectric member 302) of the optical filter 301, the experiment assumes, for example, one which enters from outside when the lens is replaced or the like of the single-lens reflex digital camera mounting on the optical fitter 301. Furthermore, along with the operation of a focal plane shutter 50 which will be described later, dust of abrasion powder produced from components of the focal plane shutter 50 or the like is assumed. This experiment uses dust equivalent to the dust assumed above, one made of resin such as epoxy, PC, ABS or polystyrene based resin, fluoric rubber and aluminum or the like whose size is uniformed to the order of 100 μm per dust particle. Here, all the components making up the above described dust are composed at the same ratio.

In this experiment, the above described dust is sprinkled over the effective area 306 of the piezoelectric member 302 first. The operation of sprinkling this dust is performed in such a way that the sticking density of dust in the effective area 306 becomes substantially uniform and the result thereof is observed using a microscope. Here, it is confirmed that the sticking density of dust eventually becomes approximately 1000 grains/mm$^2$. In order to excite the surface acoustic wave 308 on the surface of piezoelectric member 302, the AC voltage is applied to the single-phase electrode transducer 304 repeatedly on a periodical basis for the predetermined time period as described above. After that, the dust removal condition on the effective area 306 is observed using a microscope. As a result, it was possible to confirm that all dust was removed from the effective area 306.

As described in the second embodiment above, this embodiment can also be adapted so as to provide only the filter body 303 with the function as the optical filter. In this case, for example, ZnO which shows no birefringence, yet has light transmittivity in the visible light area is used as the piezoelectric member 302.

Fourth Embodiment

Figure 8:
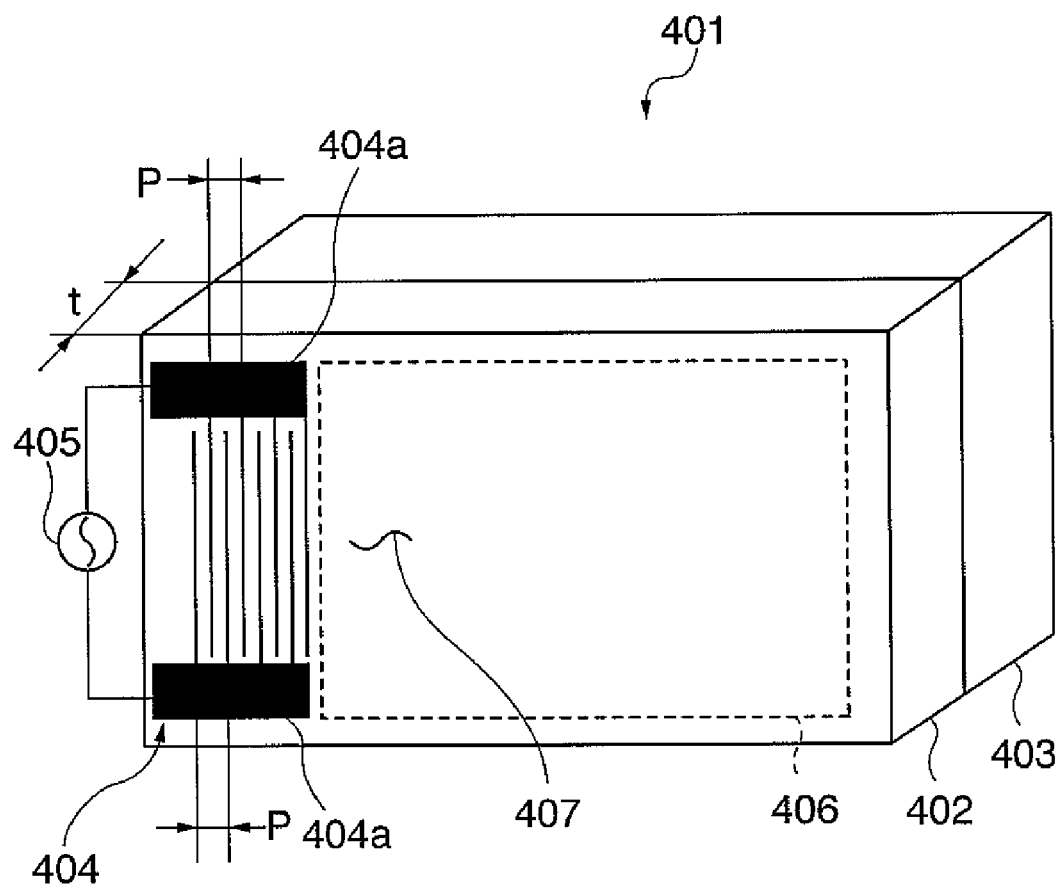
FIG. 8 is a perspective view showing the configuration of an optical filter according to a fourth embodiment of the present invention.

Next, a fourth embodiment of the present invention will be explained with reference to FIG. 8. FIG. 8 is a perspective view showing the configuration of an optical filter according to the fourth embodiment of the present invention.

The optical filter of this embodiment is an optical filter 401 for which an interdigital transducer 404 is formed as shown in FIG. 8. More specifically, this optical filter 401 is provided with a filter body 403 which has light transmittivity and birefringence. A rectangular flat-shaped piezoelectric member 402 is directly joined to one of the surfaces (incidence surface) of the filter body 403 using an adhesive. As this adhesive, for example, an acrylic or epoxy based adhesive having a refractive index of 1.5 is used. The piezoelectric member 402 has a large electromechanical coupling coefficient and has transmittivity and birefringence. An effective area 406 is specified for the piezoelectric member 402. An interdigital transducer 404 is formed for the piezoelectric member 402. This interdigital transducer 404 includes a pair of mutually opposed comb-shaped electrodes 404a formed on one of the surfaces (incidence surface) of the piezoelectric member 402. Each comb-shaped electrode 404a is arranged so as not to interfere with the effective area 406. Each comb-shaped electrode 404a is formed using the photoetching method described in the third embodiment above or the like.

An AC voltage is applied between the comb-shaped electrodes 404a from the power circuit 405. This causes a surface acoustic wave 407 to be excited on one of the surfaces (incidence surface) of the piezoelectric member 402.

This embodiment uses $LiNbO_3$ having a thickness of 0.4 mm as the piezoelectric member 402. It also uses crystal having a thickness of 2.54 mm as the filter body 403. In the case of this configuration, the separation width between an ordinary ray and an extraordinary ray is approximately 15 μm.

Furthermore, in the case where the propagation speed V of the surface acoustic wave 407 on the piezoelectric member 402 is 4000 m/sec and the frequency f of the AC voltage applied from the power circuit 405 is 50 MHz, when the pitch P between the comb-shaped electrodes 404a is set to 80 μm based on the above Expression (1), the surface acoustic wave 407 is excited most strongly.

Furthermore, assuming that the thickness of the piezoelectric member 402 is t, it is desirable to form the piezoelectric member 402 so as to satisfy a relational expression of t>V/f. Since 90% or more of the energy of the surface acoustic wave 407 concentrates within the depth corresponding to wavelength $\lambda(=V/f)$ propagating through the piezoelectric member 402 from the surface of the piezoelectric member 402, vibration generated in the depth equal to or greater than one wavelength of the frequency f is quite small. In other words, when the thickness of the piezoelectric member 402 is t and a relation of t>V/f (more preferably t>2V/f (corresponding to two wavelengths of the frequency f) is satisfied, almost no vibration is produced on the boundary between the filter body 403 and the piezoelectric member 402. This eliminates the possibility that the piezoelectric member 402 may be detached from the filter body 403 due to vibration thereby excited and allows the mechanical intensity of the whole optical filter 401 to be maintained.

Fifth Embodiment

Figure 9:
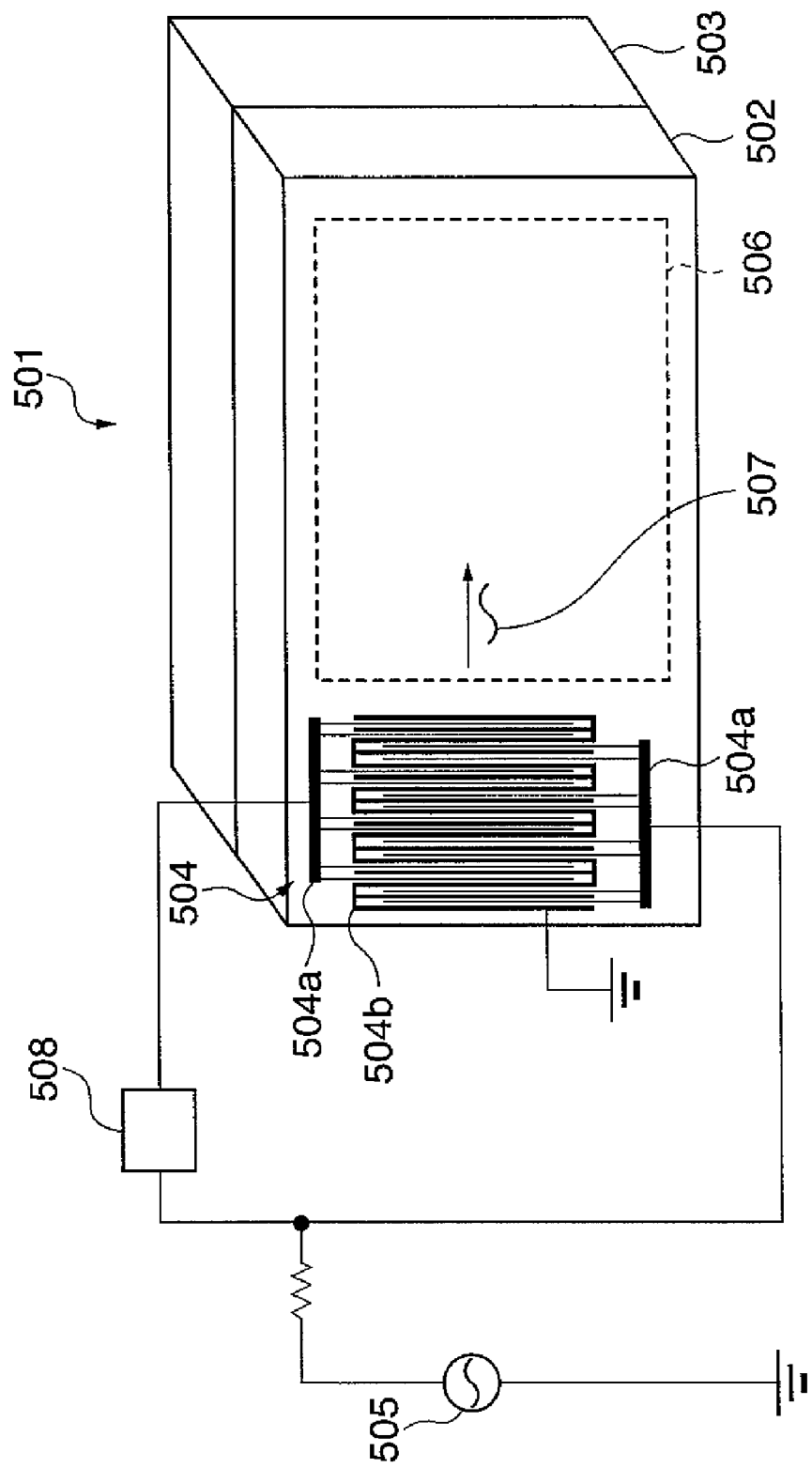
FIG. 9 is a perspective view showing the configuration of an optical filter according to a fifth embodiment of the present invention.
Figure 10:
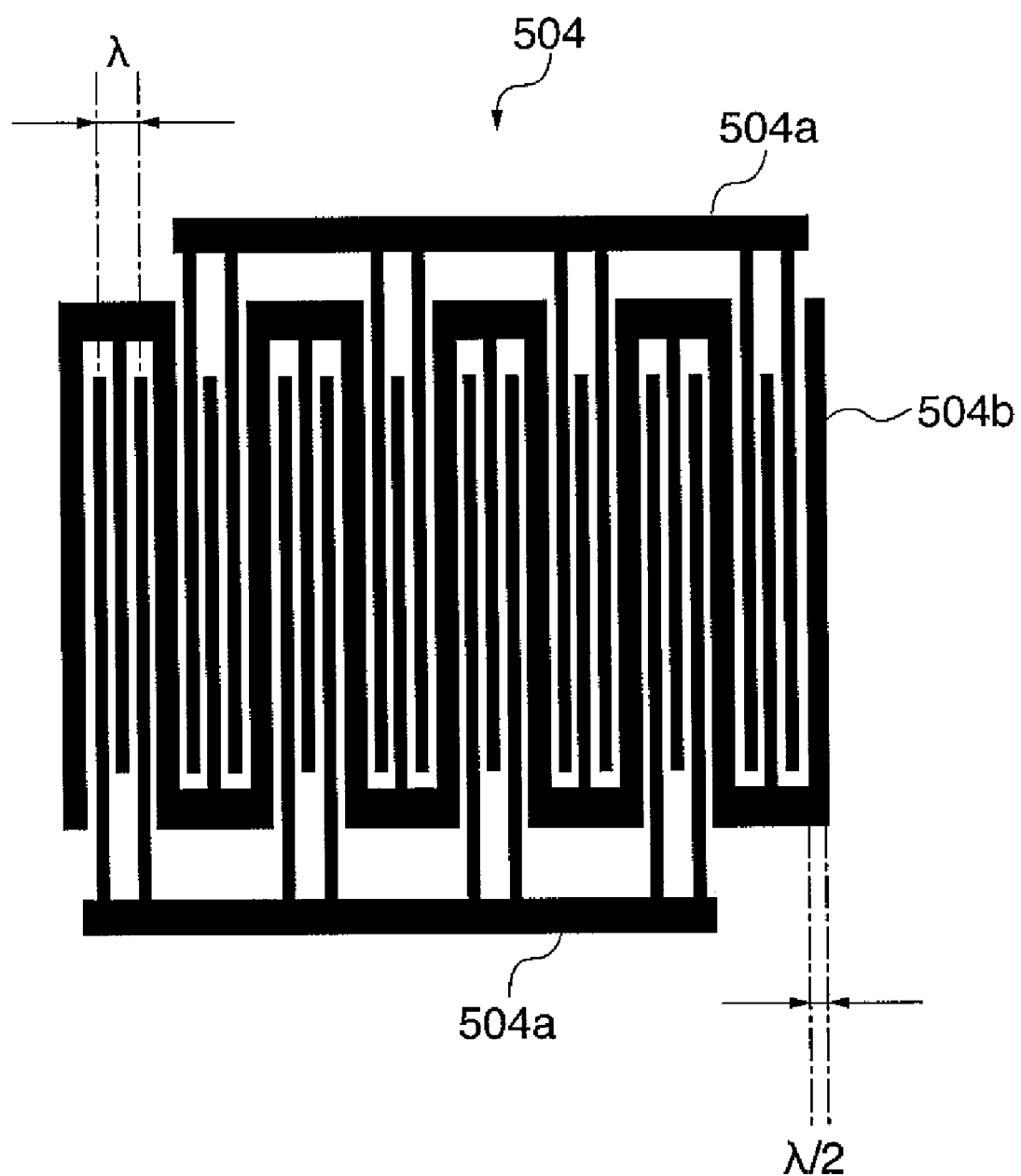
FIG. 10 is a plan view showing details of a group type one-directional interdigital transducer in FIG. 9.

Next, a fifth embodiment of the present invention will be explained with reference to FIG. 9 and FIG. 10. FIG. 9 is a perspective view showing the configuration of an optical filter according to the fifth embodiment of the present invention. FIG. 10 is a plan view showing details of a group type one-directional interdigital transducer in FIG. 9.

In the case of the interdigital transducer 404 (FIG. 8) adopted for the optical filter 401 of the above described fourth embodiment, surface acoustic waves 407 are excited in the mutually opposed directions (propagation direction of surface acoustic wave 407 in FIG. 8 and direction opposite thereto) in the areas on both sides of the interdigital transducer 404 respectively. Therefore, the electric power supplied with an AC voltage is divided into two surface acoustic waves which propagate in both directions and only part of the electric power supplied is used for the removal of dust. That is, the dust removing efficiency is low.

Therefore, this embodiment uses a one-directional interdigital transducer. This one-directional interdigital transducer has advantages of improving the dust removing efficiency and reducing power consumption. This one-directional interdigital transducer allows surface acoustic waves to be excited only in an image-pickup area, and theoretically all the electric power supplied is used to remove dust. That is, the optical filter of this embodiment exerts the effect of being able to remove dust with less electric power than the optical filter 401 in the above described fourth embodiment.

Here, examples of the one-directional interdigital transducer include a single-phase one-directional type and a multi-phase one-directional type, and the multi-phase one-directional type is preferably used to increase the proportion of electric power consumed to remove dust with respect to the electric power supplied. Moreover, examples of the multi-phase one-directional interdigital transducer include a three-phase one-directional type and a group type one-directional type, and the group type one-directional type is more preferably used.

In the optical filter 501 of this embodiment, as shown in FIG. 9, a group type one-directional interdigital transducer 504 is formed instead of the interdigital transducer 404 of the above described fourth embodiment. Here, a piezoelectric member 502 and a filter body 503 are equivalent to the piezoelectric member 402 and the filter body 403 of the above described fourth embodiment and explanations thereof will be omitted.

The group type one-directional interdigital transducer 504 is formed on the surface of the piezoelectric member 502 so as not to interfere with an effective area 506. The group type one-directional interdigital transducer 504 includes a pair of mutually opposed electrodes (comb-shaped electrodes) 504a and a ground electrode 504b. An AC voltage is applied to one of the electrodes 504a from a power circuit 505. Furthermore, an AC voltage is applied to the other electrode 504a through a π/2(rad) phase shifter 508. That is, an AC voltage whose phase is shifted by π/2(rad) with respect to the AC voltage applied to one electrode 504a is applied to the other electrode 504a.

As shown in FIG. 10, a pitch P between the electrodes of each electrode 504a is set so as to satisfy the relationship of λ=V/f (λ: wavelength of the surface acoustic waves 507 (FIG. 9)). Furthermore, the ground electrode 504b has an electrode width of λ/2 and is arranged in such a way that the each surface acoustic wave 507 excited between groups made up of paired electrodes 504a have the same phase. In this embodiment, since the propagation speed V of the each surface acoustic wave 507 of the piezoelectric member 502 is 4000 m/s and the frequency f of the AC voltage is 50 MHz, the pitch P between the electrodes 504a is set to 80 μm (λ=V/f) where excitation to the piezoelectric member 502 becomes a maximum. Furthermore, the electrode width (λ/2) of the ground electrode 504b is set to 40 μm.

In this group type one-directional interdigital transducer 504, since AC voltages with different phases are respectively applied to the electrodes 504a, one-directional surface acoustic waves 507 are excited on the surface of the piezoelectric member 502. Here, the AC voltage is applied repeatedly on a periodical basis over the predetermined time period as described above in FIG. 6.

In this group type one-directional interdigital transducer 504, when the pitch P of each electrode 504a is 80 μm and the electrode width of the ground electrode 504b is 40 μm, surface acoustic waves 507 are excited most strongly. Furthermore, the vibration amplitude in this case is approximately 28 nm and this is approximately twice that when the same AC voltage is applied in the above described fourth embodiment.

Sixth Embodiment

Figure 11:
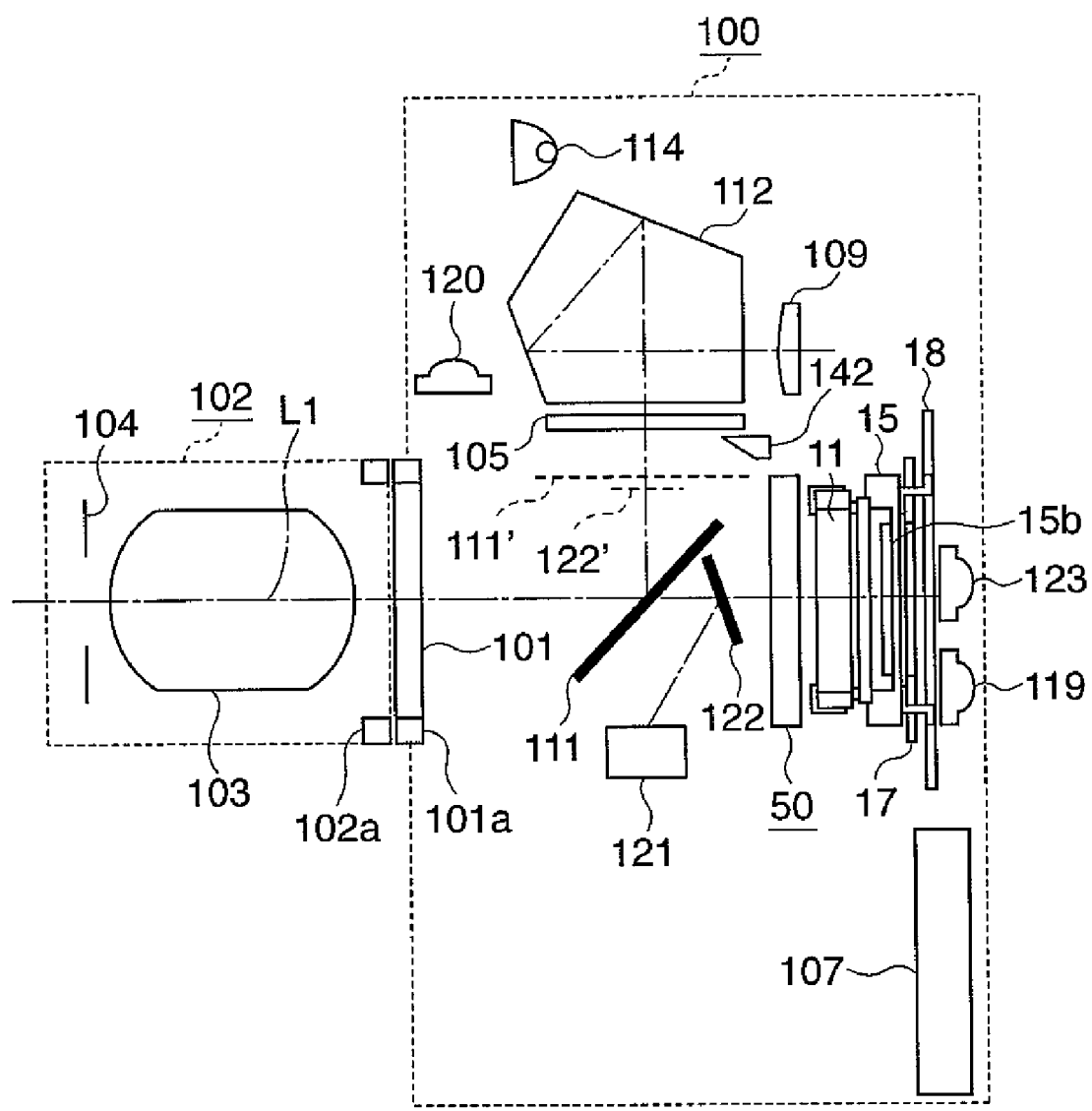
FIG. 11 is a longitudinal sectional view schematically showing the configuration of a single-lens reflex type digital camera mounted with the optical filter of the above described fifth embodiment.

Next, a sixth embodiment of the present invention will be explained with reference to FIG. 11. FIG. 11 is a longitudinal sectional view schematically showing the configuration of a single-lens reflex digital camera mounted with the optical filter according to the above described fifth embodiment.

Here, in this embodiment, the optical filter 501 of the above described fifth embodiment is applied to the optical filter of a single-lens reflex digital camera.

As shown in FIG. 11, the single-lens reflex digital camera is provided with a camera body 100 which couples with a lens apparatus 102 in a detachable manner. Here, the lens apparatus 102 incorporates a photographic optical system 103 which defines an optical path L1 of image-taking light, a diaphragm 104 which regulates the amount of incident light which enters along the optical path L1 and a terminal 102a. When the lens apparatus 102 is engaged with a mount mechanism 101 of the camera body 100, this terminal 102a is electrically connected to a terminal 101a provided for the mount mechanism 101. In this way, the lens apparatus 102 is electrically connected to the camera body 100 and the camera body 100 can obtain information stored in the lens apparatus 102 such as a focal length of the lens apparatus 102, set value of the diaphragm 104.

The camera body 100 has the above described mount mechanism 101 and a half mirror 111 which is movable within a predetermined range. The half mirror 111 reflects part of the image-taking light introduced from the photographic optical system 103 along the optical path L1 toward a focusing screen 105 and lets pass the remainder of the light. The refractive index of this half mirror 111 is approximately 1.5 and the thickness thereof is 0.5 mm. The half mirror 111 moves between a first optical path split position and a second optical path split position. Here, the first optical path split position is a position at which the half mirror 111 guides (reflects) part of the light to the focusing screen 105. The second optical path split position is a position at which the half mirror 111 is retracted from the optical path L1 (position 111T shown by a broken line in FIG. 11) to directly guide the light from the photographic optical system 103 to a solid image-pickup apparatus 15.

An image of light reflected by the half mirror 111 is formed on the focusing screen 105 and this optical image is guided to the outside from a finder lens 109 after passing through the interior of a pentaprism 112. This allows a photographer to observe the optical image formed on the focusing screen 105 through the finder lens 109. Specific information (for example, shutter speed, diaphragm value, image-taking mode or the like) is displayed by an information display unit 142 on the above described focusing screen 105.

A movable sub mirror 122 is provided on the back side of this half mirror 111. This sub mirror 122 reflects light close to the optical path L1 out of the light which has passed through the half mirror 111 and this reflected light is guided to a focus detection unit 121. This focus detection unit 121 receives the reflected light from the sub mirror 122 and detects a focus according to a phase difference detection scheme based on this received light.

The above described sub mirror 122 moves in conjunction with the movement of the half mirror 111 while angularly rotating around the rotating shaft provided for a holding member (not shown) of the half mirror 111. Here, when the half mirror 111 is in the first optical path split position, the sub mirror 122 is in the position of reflecting the light which has passed through the half mirror 111 to the focus detection unit 121. On the other hand, when the half mirror 111 moves to the second optical path split position, the sub mirror 122 moves in conjunction therewith to a position retracted from the optical path L1 (position 1221 shown by a broken line in FIG. 11).

On the back side of the above half mirror 111, the focal plane shutter 50 for controlling the amount of light incident upon a solid image-pickup element 15b of the solid image-pickup apparatus 15, an optical filter 11, the solid image-pickup apparatus 15 or the like are arranged in order. Details of these components will be described later.

Furthermore, the camera body 100 is provided with a movable flash light emitting unit 114, a display section 107, a main switch 119, a shutter release button 120 and a switch 123.

The flash light emitting unit 114 is movable between a housing position at which it is housed in the camera body 100 and a light emitting position at which it is exposed out of the camera body 100. The display section 107 is made up of a liquid crystal display or the like and displays a captured image or various kinds of information including a photographic mode and shooting condition or the like.

The main switch 119 is a switch to start the camera body 100. The shutter release button 120 is a button which can be operated by being pressed in two stages. When this shutter release button 120 is pressed halfway down (SW1 on), a photographic preparation operation (photometric operation and focus control operation or the like) is started. On the other hand, when the shutter release button 120 is pressed to the full (SW2 on), a photographic operation (image data read from the image-pickup element 15b is recorded into the memory) is started. The switch 123 is a mode changeover switch to change a mode set in the camera body 100 to a cleaning mode. This cleaning mode is a mode to remove foreign substances (dust) stuck to the surface of the optical filter 11 of the camera body 100 and details thereof will be described later.

Figure 12:
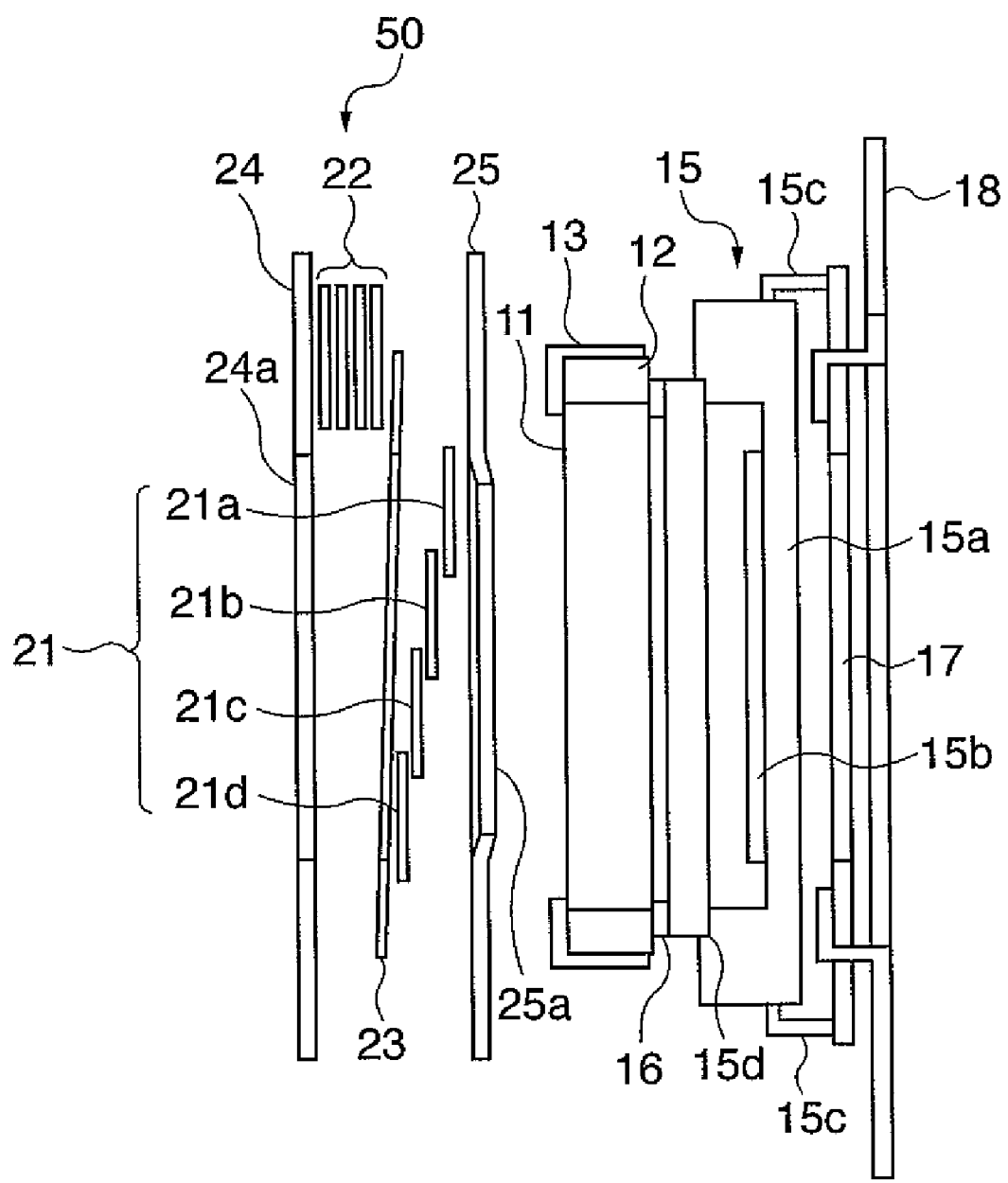
FIG. 12 is a longitudinal sectional view showing the configuration of a focal plane shutter and the periphery of a solid image-pickup apparatus in FIG. 11.

Next, the configuration of the focal plane shutter 50 and the periphery of the solid image-pickup apparatus 15 will be explained with reference to FIG. 12. FIG. 12 is a longitudinal sectional view showing the configuration of the focal plane shutter 50 and the periphery of the solid image-pickup apparatus 15 in FIG. 11.

As shown in FIG. 12, the focal plane shutter 50 has a front screen 21, a rear screen 22, a holding plate 24, a cover plate 25 and an intermediate plate 23. The front screen 21 is composed of a plurality of shutter blades 21a to 21d. The rear screen 22 is composed of a plurality of shutter blades as in the case of the front screen 21. The holding plate 24 is a holding plate for the rear screen 22 and an opening 24a is provided in the center to receive image-pickup light. The cover plate 25 is a holding plate for the front screen 21 and an opening 25a is provided in the center to receive image-pickup light. The intermediate plate 23 is inserted between the holding plate 24 and the cover plate 25. With this intermediate plate 23, the space between the holding plate 24 and the cover plate 25 is separated into a space for driving the front screen 21 and a space for driving the rear screen 22.

The optical filter 11 arranged on the back side of the focal plane shutter 50 has a configuration equivalent to that of the optical filter 501 of the above described fifth embodiment. Here, the optical filter 11 is configured so as to have characteristics of limiting the passage of light in a predetermined band out of the light from the photographic optical system 103. The edge of the optical filter 11 is held by a holding member 12, and the holding member 12 is united with the optical filter 11 and supported by a support member 13. The support member 13 is fixed to a chassis (not shown) of the camera body 100.

The solid image-pickup apparatus 15 which is arranged on the back side of the optical filter 11 has a base 15a which has an opening toward the optical filter 11 side. The base 15a incorporates an image-pickup element 15b. The image-pickup element 15b is made up of, for example, a CMOS process compatible sensor, which is one of amplification type solid image-pickup elements. This image-pickup element 15b is connected to a plurality of connection terminals 15c through the conductive base 15a. This causes the image-pickup element 15b to be electrically connected to a substrate 17 through each connection terminal 15c. The opening of the base 15a is covered with a transparent cover member 15d to protect the image-pickup element 15b and the space in the base 15a is sealed from the outside by this cover member 15d.

There is a space between this cover member 15d and the optical filter 11 and the space produced between the cover member 15d and the optical filter 11 is sealed from the outside by a seal member 16. This prevents dust from entering into the space between the cover member 15d and the optical filter 11. The substrate 17 and the solid image-pickup apparatus 15 are united together and held by a holding plate 18 and the holding plate 18 is fixed to a chassis (not shown) of the camera body 100 using screws (not shown).

Figure 13:
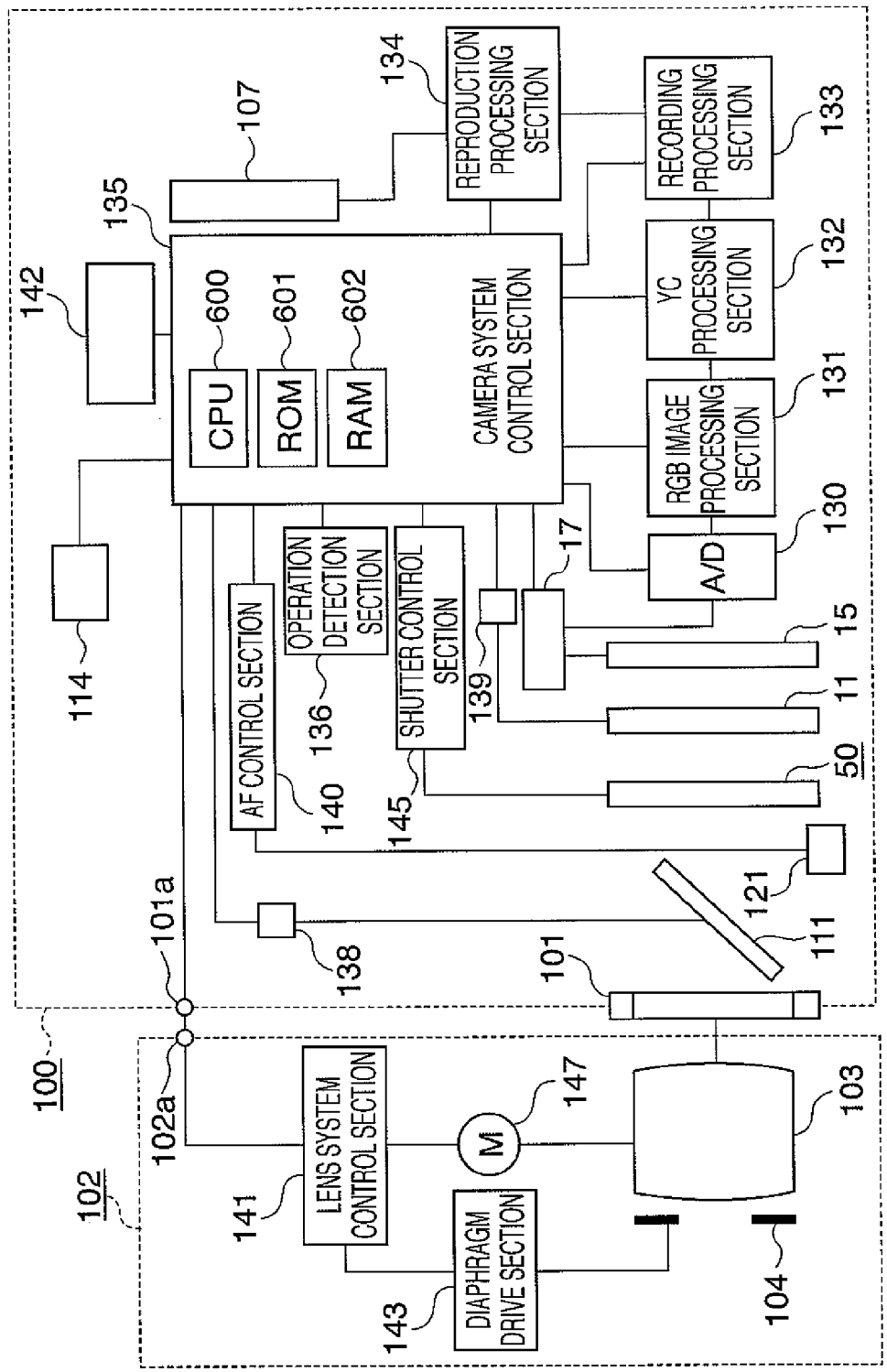
FIG. 13 is a block diagram showing the control configuration of the camera in FIG. 11.

Next, the control configuration of the digital camera of this embodiment will be explained with reference to FIG. 13. FIG. 13 is a block diagram showing the control configuration of the digital camera in FIG. 11.

In the control configuration of this embodiment, as shown in FIG. 13, the camera body 100 is provided with a camera system control section 135. The camera system control section 135 has a CPU 600, a ROM 601 and a RAM 602. The CPU 600 controls the whole digital camera according to a program stored in the ROM 601 and performs various types of control individually. The RAM 602 provides a working area for the CPU 600.

When the lens apparatus 102 is coupled with the camera body 100 through the mount mechanism 101, the terminal 101a and terminal 102a are electrically connected. This allows the camera system control section 135 to communicate with a lens system control section 141 which is in the lens apparatus 102. The lens system control section 141 sends out a lens state signal indicating a state (diaphragm value of the diaphragm 104, focal length, position of the focus lens or the like) of the lens apparatus 102 to the camera system control section 135.

The camera system control section 135 receives a detection signal from an operation detection section 136 which will be described later, a signal from an AF control section 140 or the like as input in addition to the above described lens state signal. Here, the operation detection section 136 detects whether or not there are any operations of the main switch 119, shutter release button 120, switch 123 or the like in FIG. 11 and outputs an operation detection signal indicating the detection result to the camera system control section 135. The AF control section 140 generates a signal indicating the focus control state (defocus amount) of the photographic optical system 103 based on the output signal from the switch focus detection unit 121 and outputs the signal to the camera system control section 135. The focus detection unit 121 detects an in-focus state of an image in the focus detection area provided at a predetermined position in its image-taking screen and outputs a signal indicating this detection result.

The camera system control section 135 generates control signals individually for the lens system control section 141 and the respective sections of the camera body 100 based on the lens state signal from the above described lens system control section 141, the detection signal from the operation detection section 136 and the signal from the AF control section 140 or the like. This control signal is a signal to control operation timing, operation contents or the like.

Here, the camera body 100 is provided with a half mirror drive section 138, a shutter control section 145, an optical filter drive section 139 and a substrate 17 and control signals for the respective sections are individually generated by the camera system control section 135. Furthermore, the camera body 100 is also provided with an A/D converter 130, an RGB image processing section 131, a YC processing section 132, a recording processing section 133, a reproduction processing section 134, an information display section 142 or the like and control signals for the respective sections are individually generated by the camera system control section 135.

The lens system control section 141 generates a drive signal for a diaphragm drive section 143 which drives the diaphragm 104 based on a control signal from the camera system control section 135 and instructs a diaphragm value on the diaphragm diameter of the diaphragm 104. The diaphragm drive section 143 drives the diaphragm 104 so that the diaphragm diameter of the diaphragm 104 becomes the instructed diaphragm value based on the above described drive signal. Furthermore, the lens system control section 141 generates a drive signal for an AF motor 147 which drives the focus lens of the photographic optical system 103 based on a control signal from the camera system control section 135 and instructs the movement position of the focus lens. Based on this drive signal, the AF motor 147 moves the above described focus lens to the above instructed position.

The half mirror drive section 138 of the camera body 100 drives the half mirror 111 based on a control signal from the camera system control section 135. The shutter control section 145 drives the focal plane shutter 50 (specifically, the front screen 21 and the rear screen 22) based on a control signal from camera system control section 135. The optical filter drive section 139 applies an AC voltage of a predetermined frequency to the group type one-directional interdigital transducer (504 in FIG. 9) of the optical filter 11 repeatedly on a periodical basis over the predetermined time period. This causes a surface acoustic wave to be excited on the surface (incidence surface) of the optical filter 11. The substrate 17 reads the image-pickup signal (electric signal) of the solid image-pickup apparatus 15 at predetermined timing based on a control signal from the camera system control section 135 and outputs this read image-pickup signal to the A/D converter 130.

The A/D converter 130 converts the image-pickup signal to each digital signal of R, G, B of, for example, 10 bits according to the amplitude of the above described image-pickup signal. The RGB image processing section 131 applies white balancing, gamma correction, high resolution processing through an interpolation or the like to each digital signal of R, G, B inputted from the A/D converter 130. The YC processing section 132 generates a brightness signal Y and color difference signals R-Y and B-Y from each digital signal of R, G, B inputted from the RGB image processing section 131. The brightness signal Y and color difference signals R-Y and B-Y generated are inputted to the recording processing section 133 as image signals. The operations of the A/D converters 130, RGB image processing sections 131 and YC processing sections 132 are controlled by control signals outputted from the camera system control section 135 to the respective sections.

The recording processing section 133 performs writing processing writing the inputted image signal into a memory (not shown) such as a CF card (registered trademark) and also performs reading processing reading the image signal from the memory based on a control signal from the camera system control section 135. The reproduction processing section 134 reproduces the image signal read from the above described memory based on a control signal from the camera system control section 135 and outputs the reproduced image signal to the display section 107. It is also possible to adopt a configuration in which this reproduction processing section 134 and display section 107 are connected through a radio communication such as Bluetooth (registered trademark). In this case, it is possible to monitor an image taken by this digital camera at a position remote from the digital camera.

The information display unit 142 displays specific information on the focusing screen 105 (FIG. 11) based on a control signal from the camera system control section 135. This specific information displayed is information which is given from the camera system control section 135 together with the above described control signal. The flash light emitting unit 114 emits flash light at predetermined timing based on a control signal from the camera system control section 135.

Figure 14:
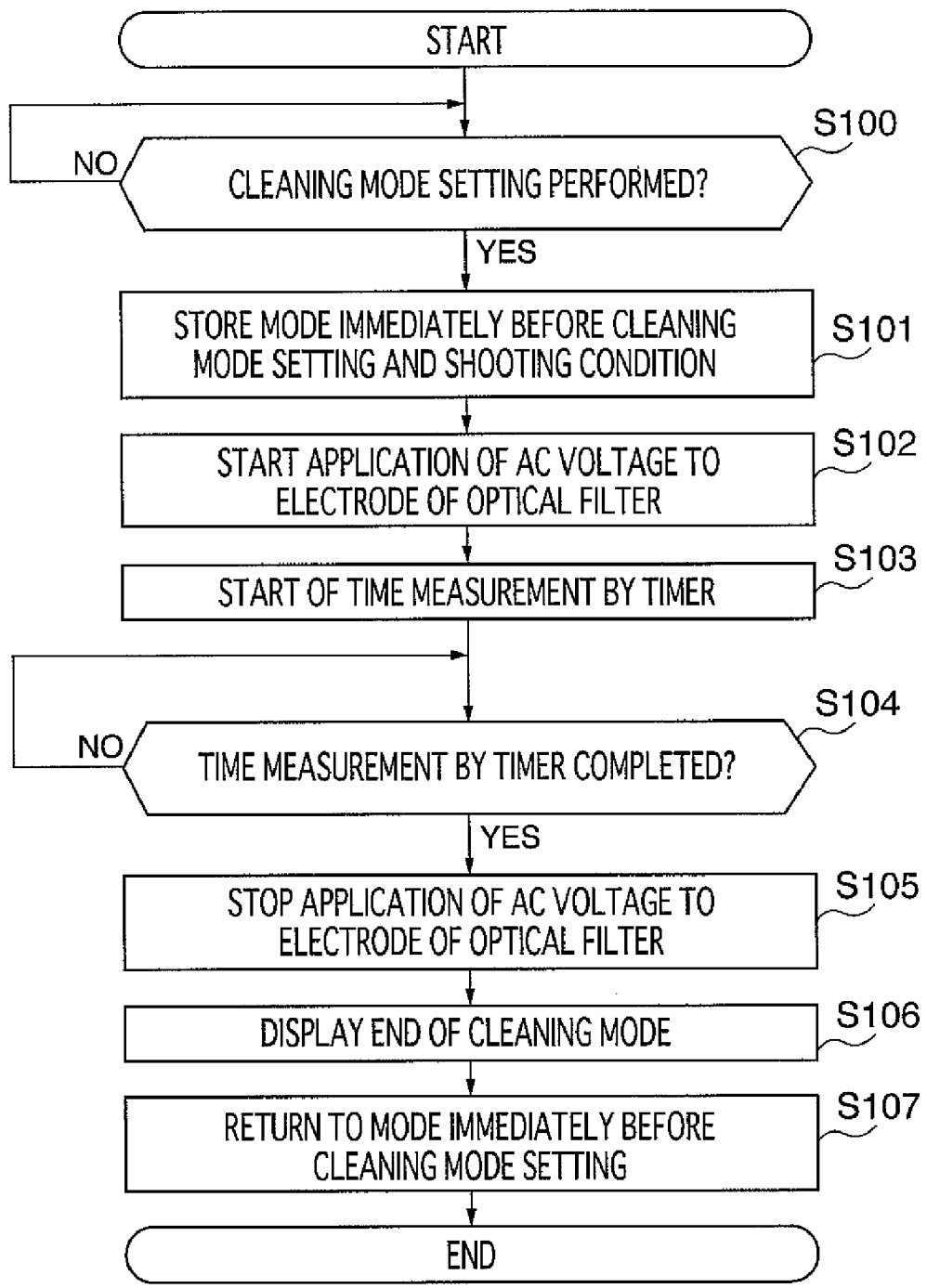
FIG. 14 is a flow chart showing the procedure of a cleaning mode process carried out by a camera system control section in FIG. 13.

Next, the cleaning mode according to this embodiment will be explained with reference to FIG. 14. FIG. 14 is a flow chart showing a procedure of the cleaning mode process carried out by the camera system control section 135 in FIG. 13. This procedure is executed by the CPU 600 according to a program stored in the ROM 601 of the camera system control section 135.

As described above, the cleaning mode is a mode for removing dust stuck to the surface of the optical filter 11 of the camera body 100. This cleaning mode is executed in response to a switching operation by the switch 123.

The CPU 600 of the camera system control section 135 is monitoring whether or not switchover to a cleaning mode setting is performed through the operation of the switch 123 based on a signal from the operation detection section 136 as shown in FIG. 14 (step S100). When it is detected here that the switchover to the cleaning mode setting has been performed, the CPU 600 stores the mode set immediately before the switchover to the cleaning mode setting and shooting conditions (shutter speed, diaphragm value or the like) in the RAM 602 (step S101). The CPU 600 then outputs a control signal to instruct the start of application of an AC voltage to the optical filter drive section 139 (step S102). The optical filter drive section 139 starts the application of the AC voltage of a predetermined frequency to the group type one-directional interdigital transducer 504 (FIG. 11) of the optical filter 11 based on the above described control signal.

Next, the CPU 600 sets a time predetermined in a timer (not shown) and starts to measure the predetermined time period in the timer (step S103). The CPU 600 then waits for the measurement of the predetermined time period in this timer to end (step S104). During this predetermined time period, the AC voltage is applied to the group type one-directional interdigital transducer 504 of the optical filter 11 repeatedly on a periodical basis for a predetermined period and the surface acoustic wave is excited on the surface of the optical filter 11. In this embodiment, for example, 20 seconds is set as the predetermined time period. Dust stuck to the surface of optical filter 11 is separated from the surface and falls down to the lower part of the camera body 100.

When, the time measurement of the predetermined time ends, the CPU 600 outputs a control signal for instructing the optical filter drive section 139 to stop the application of the AC voltage (step S105). The optical filter drive section 139 stops the application of the AC voltage to the group type one-directional interdigital transducer 504 on the optical filter 11 based on the above described control signal. This causes the excitation of the surface acoustic wave on the surface of the optical filter 11 to stop and the cleaning mode ends.

Next, the CPU 600 displays a message that the cleaning mode has ended on the display section 107 (step S106). Then, the CPU 600 reads the mode and the shooting condition or the like stored in the RAM 602 in above step S101 and returns to a state corresponding to this read mode and the shooting condition (mode immediately before the cleaning mode setting) (step S107). The CPU 600 then ends this processing.

According to this embodiment, by using the optical filter (501) of the above described fifth embodiment as the optical filter 11, the distance between the solid image-pickup apparatus 15 and the shutter 50 can be substantially reduced compared to the case where the conventional dust removing mechanism is used. That is, it is possible to remove dust which can lead to image shadows onto the image captured without reducing shutter efficiency.

Furthermore, it is possible to easily remove dust on the surface of the optical filter 11 by exciting the surface acoustic wave on the surface of the optical filter 11. That is, even if dust introduced when lenses are replaced or the like or abrasion powder produced when the shutter 50 is driven or the like is stuck to the surface of the optical filter 11, the dust (or the abrasion powder) can be removed. As a result, it is possible to provide a single-lens reflex digital camera capable of always taking an image of good image quality without imaging shadows of dust.

This embodiment uses the optical filter 11 having the configuration equivalent to the configuration of the optical filter (501) of the above described fifth embodiment. In stead of this, the optical filter 11 having a configuration equivalent to that of any one of the optical filters of the above described first to fourth embodiments can also be used. Similar effects can be obtained in this case, too.

In this embodiment, the execution of the cleaning mode is controlled according to the operation of the switch 123, but instead of this, it is also possible to adopt a sequence such that the cleaning mode is executed when power is turned on as a trigger. Furthermore, it is also possible to adopt a sequence such that the cleaning mode is executed when the shooting operation ends as a trigger.

Figure 15:
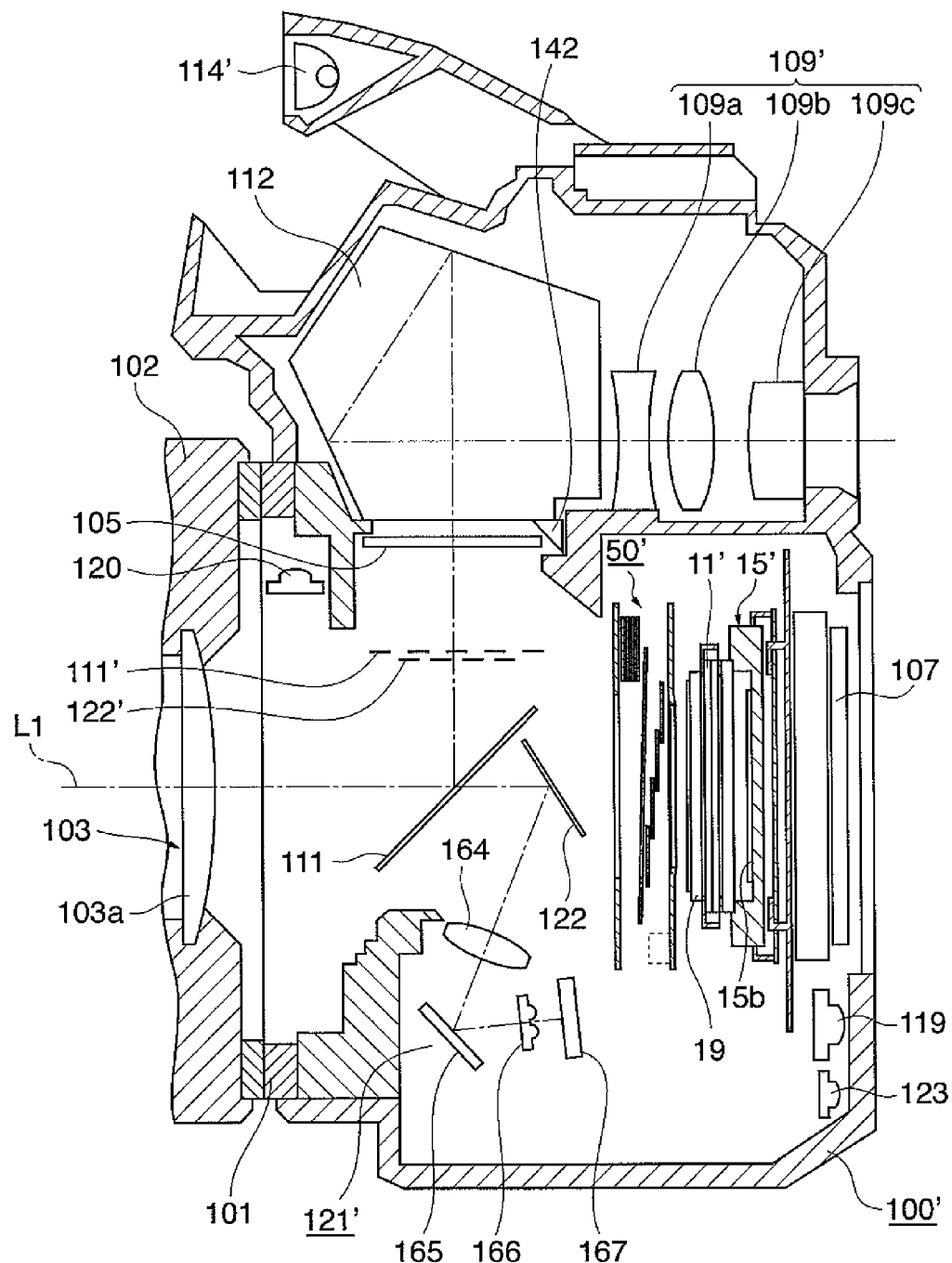
FIG. 15 is a longitudinal sectional view showing the configuration of a variation of a camera body in FIG. 11.

FIG. 15 is a longitudinal sectional view showing the configuration of a variation of the camera body 100 in FIG. 11. Here, the basic configuration of the camera body applied to this variation is the same as the configuration of above described FIG. 11. Therefore, in this variation, parts which are different from the configuration of above described FIG. 11 will be explained. Moreover, members in FIG. 15 identical to those in the configuration in FIG. 11 are assigned the same reference numerals.

As shown in FIG. 15, the single-lens reflex digital camera is provided with a camera body 100' which couples with the lens apparatus 102 in a detachable manner. Here, as for the photographic optical system 103, only a lens 103a out of a plurality of lenses which make up the photographic optical system 103 is shown.

The camera body 100' is provided with a mount mechanism 101 which couples with the lens apparatus 102 in a detachable manner and a half mirror 111 which is movable within a predetermined range.

The light reflected by the half mirror 111 forms an image on a focusing screen 105 and this optical image is guided to the outside from a finder lens group 109' after passing through the interior of the pentaprism 112. This finder lens group 109' is made up of a plurality of lenses 109a, 109b and 109c. The photographer can observe the optical image formed on the focusing screen 105 through the finder lens group 109'.

A sub mirror 122 reflects light close to an optical path L1 out of the light which has passed through the half mirror 111 and this reflected light is guided to a focus detection unit 121'. This focus detection unit 121' is provided with a lens 164, a reflecting mirror 165, a lens 166 and a focus detection section 167.

The light reflected by the sub mirror 122 and the above described focus detection unit 121' is guided to the focus detection section 167 through the lens 164, reflecting mirror 165 and lens 166. This focus detection section 167 receives the reflected light from the sub mirror 122 and detects a focus according to a phase difference detection scheme based on this received light.

A flash light emitting unit 114' is movable between a housing position at which it is housed in the camera body 100' and a light emitting position at which it is exposed out of the camera body 100' (FIG. 15).

A switch 123 is a switch to set the mode set in the camera body 100' to a cleaning mode. This cleaning mode is a mode to excite a surface acoustic wave on the optical member 19 and remove dust stuck to the surface of the optical member 19.

Figure 16:
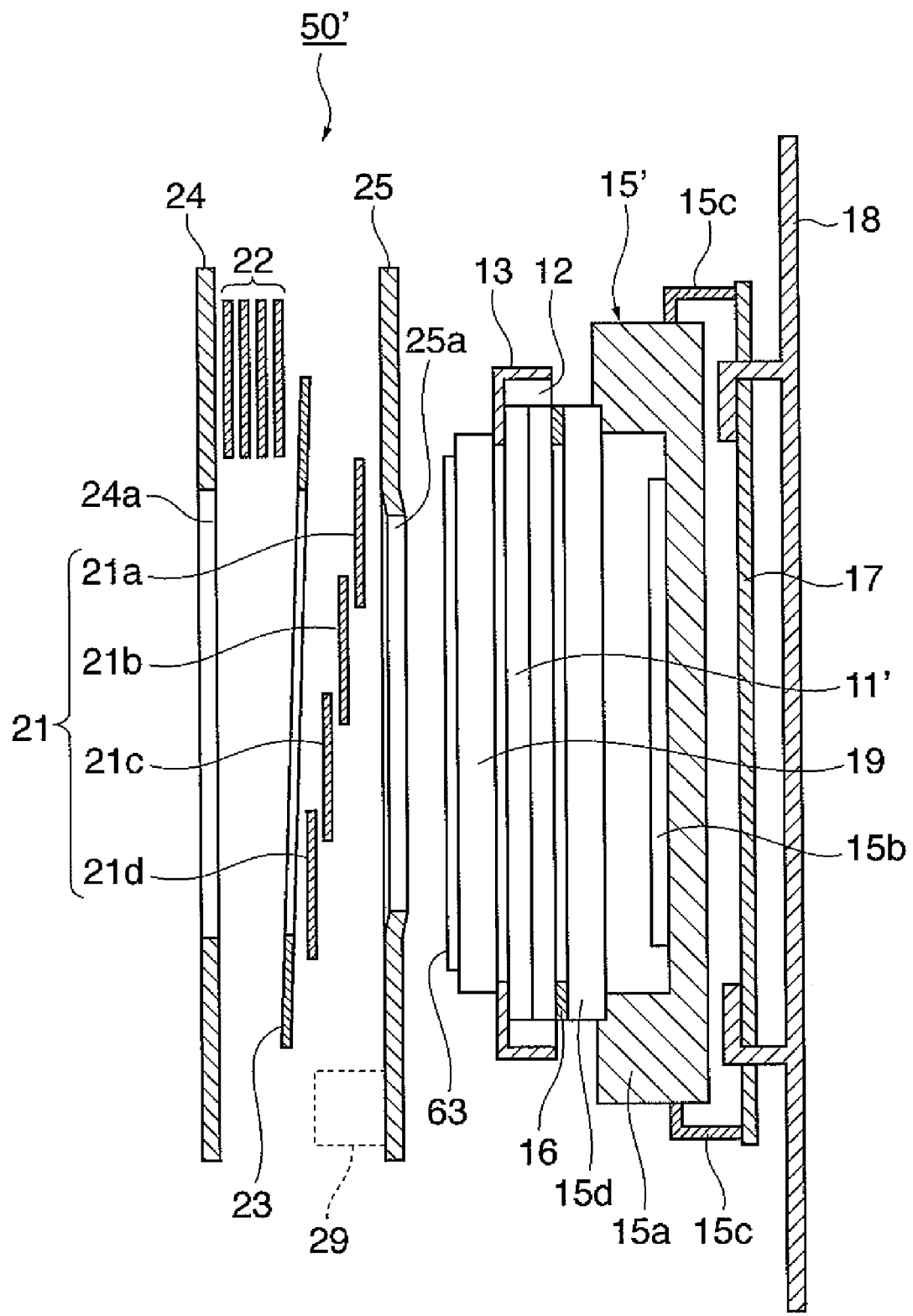
FIG. 16 is a longitudinal sectional view showing the configuration of a focal plane shutter and the periphery of a solid image-pickup apparatus in FIG. 15.

Next, the configuration of a focal plane shutter 50' and the periphery of a solid image-pickup apparatus 15' in FIG. 15 will be explained with reference to FIG. 16. FIG. 16 is a longitudinal sectional view showing the configuration of the focal plane shutter 50' and the periphery of the solid image-pickup apparatus 15' in FIG. 15. The basic configuration of the focal plane shutter 50' and the solid image-pickup apparatus 15' body applied to this embodiment here is the same as the configuration of above FIG. 12. Therefore, this embodiment will explain parts which are different from the configuration of above described FIG. 12. In FIG. 16, the same members as those in the configuration in above described FIG. 12 are assigned the same reference numerals.

In this embodiment, a cover plate 25 of the focal plane shutter 50' is provided with a stopper section 29 for positioning each of shutter blades 21a to 21d of the front screen 21 when they are opened.

In order to prevent an excessively high spatial frequency component from entering the solid image-pickup apparatus 15', an optical filter 11' arranged on the back side of the focal plane shutter 50' has a filter characteristic of limiting the passage of this frequency component. This optical filter 11' is made up of a birefringent plate such as crystal and an infrared cut filter laminated together.

A rectangular flat-shaped optical member 19 is arranged on the incidence surface (surface opposed to the shutter 50) of the optical filter 11', that is, on the surface side at a certain distance from the optical filter 11'. This optical member 19 is made up of a piezoelectric member having light transmittivity which lets pass the frequency component in the visible light area. The edge of the optical member 19 is fixed to the support member 13 so that a space formed between the optical member 19 and the optical filter 11' is blocked off from the outside. This prevents dust from entering the space between the optical member 19 and the optical filter 11'. A comb-shaped electrode 63 for exciting a surface acoustic wave on the surface is formed on the surface of the optical member 19. Details of this comb-shaped electrode 63 will be described later. Here, the optical member 19 can also be made of a piezoelectric member that works together with the optical filter 11' to realize a filter characteristic which limits the passage of a high spatial frequency component.

The space between the optical member 19 and the optical filter 11' and the space between the cover member 15d and the optical filter 11' are the spaces blocked off from the outside. Therefore, the target area of sticking of dust which becomes a factor for shadows imaged onto the captured image is the surface (incidence surface) of the optical member 19.

Figure 17:
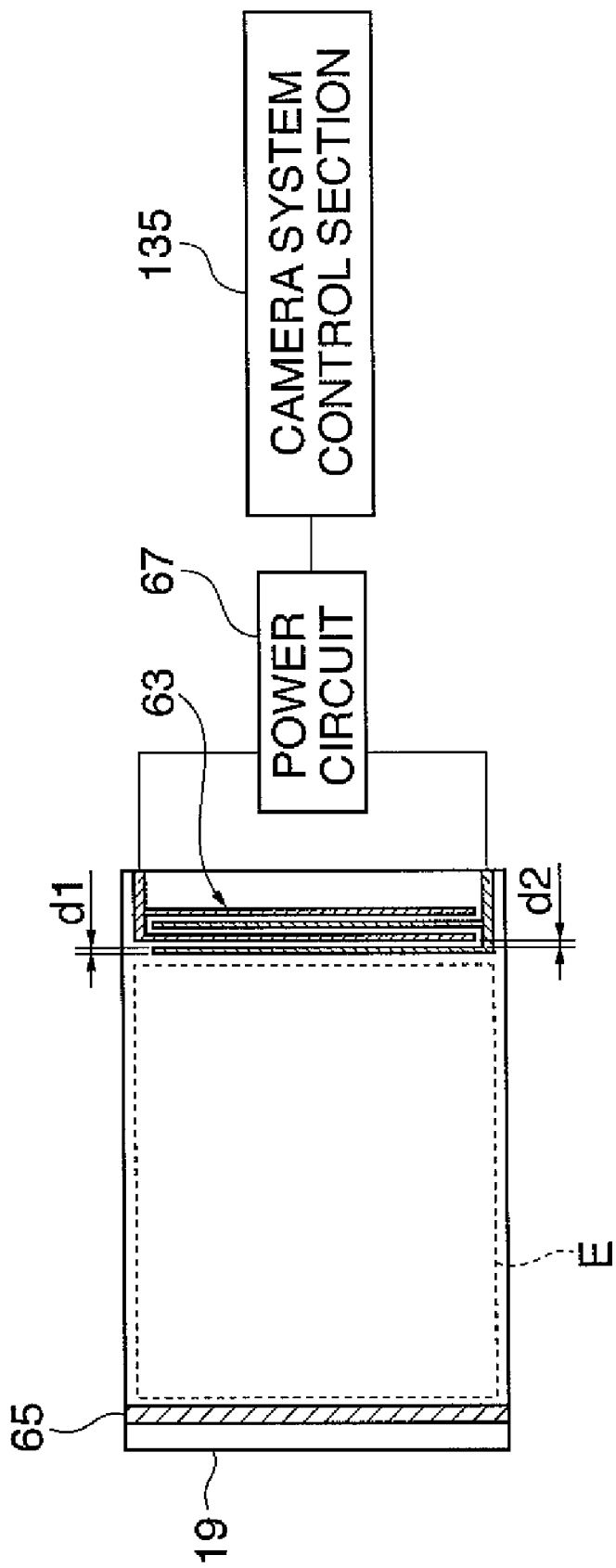
FIG. 17 is a plan view showing the configuration of a comb-shaped electrode formed on the surface of an optical member in FIG. 16.

Next, the comb-shaped electrode 63 formed on the surface of the optical member 19 will be explained in detail with reference to FIG. 17. FIG. 17 is a plan view showing the configuration of the comb-shaped electrode 63 formed on the surface of the optical member 19 in FIG. 16.

The comb-shaped electrode 63 is formed in the vicinity of one end along the short side direction so as to avoid a photographic area E specified in the optical member 19 as shown in FIG. 17. A vibration absorption member 65 is formed in the area in the vicinity of the other end along the short side direction of the optical member 19 and this vibration absorption member 65 is arranged so as to be opposed to the comb-shaped electrode 63. An AC voltage of a predetermined frequency is applied from a power circuit 67 which will be described later to the comb-shaped electrode 63 and the application operation of the AC voltage of this power circuit 67 is controlled by the camera system control section 135.

When the AC voltage of the predetermined frequency is applied to the comb-shaped electrode 63, each area in the vicinity of the surface of the optical member 19 performs ellipsoidal motion, which excites a surface acoustic wave. This surface acoustic wave proceeds from the comb-shaped electrode 63 toward the vibration absorption member 65. Since this vibration absorption member 65 absorbs the surface acoustic wave and restrains the occurrence of a reflected wave of the surface acoustic wave, it is possible to prevent the proceeding surface acoustic wave from becoming a standing wave.

Here, the cutting direction of the crystal axis of the optical member 19 is set so that when the AC voltage is applied to the comb-shaped electrode 63, the surface acoustic wave which proceeds from the comb-shaped electrode 63 of the optical member 19 toward the vibration absorption member 65 is generated. This embodiment uses crystal which is 42.75π/180(rad) Y cut with respect to the propagation surface of the surface acoustic wave as a member making up the optical member 19 and the thickness thereof is 0.5 mm.

Furthermore, assuming that the electrode width of the above described comb-shaped electrode 63 is d1, the distance between the electrodes (intersection width) is d2, the propagation speed of the surface acoustic wave excited by the optical member 19 is v and the frequency of the surface acoustic wave is f, this frequency f is given from following Expression (2).

$$f=v/\{2\times(d1+d2)\} \quad (2)$$

Here, the propagation speed v of the surface acoustic wave excited by the optical member 19 is 3157 m/sec. Furthermore, the electrode width d1 of the comb-shaped electrode 63 is set to 10 μm and the distance between the electrodes d2 is set to 20 μm. The frequency f of the surface acoustic wave in this case becomes 52 MHz according to above described Expression (2). Therefore, when an AC voltage having a frequency of 52 MHz is applied to the comb-shaped electrode 63, it is possible to excite a surface acoustic wave on the surface of the optical member 19 with maximum efficiency.

This embodiment uses the vibration absorption member 65, but it is also possible to form a comb-shaped electrode instead of the vibration absorption member 65, cause this comb-shaped electrode to excite a surface acoustic wave to thereby restrain the occurrence of the above described reflected wave.

Figure 18:
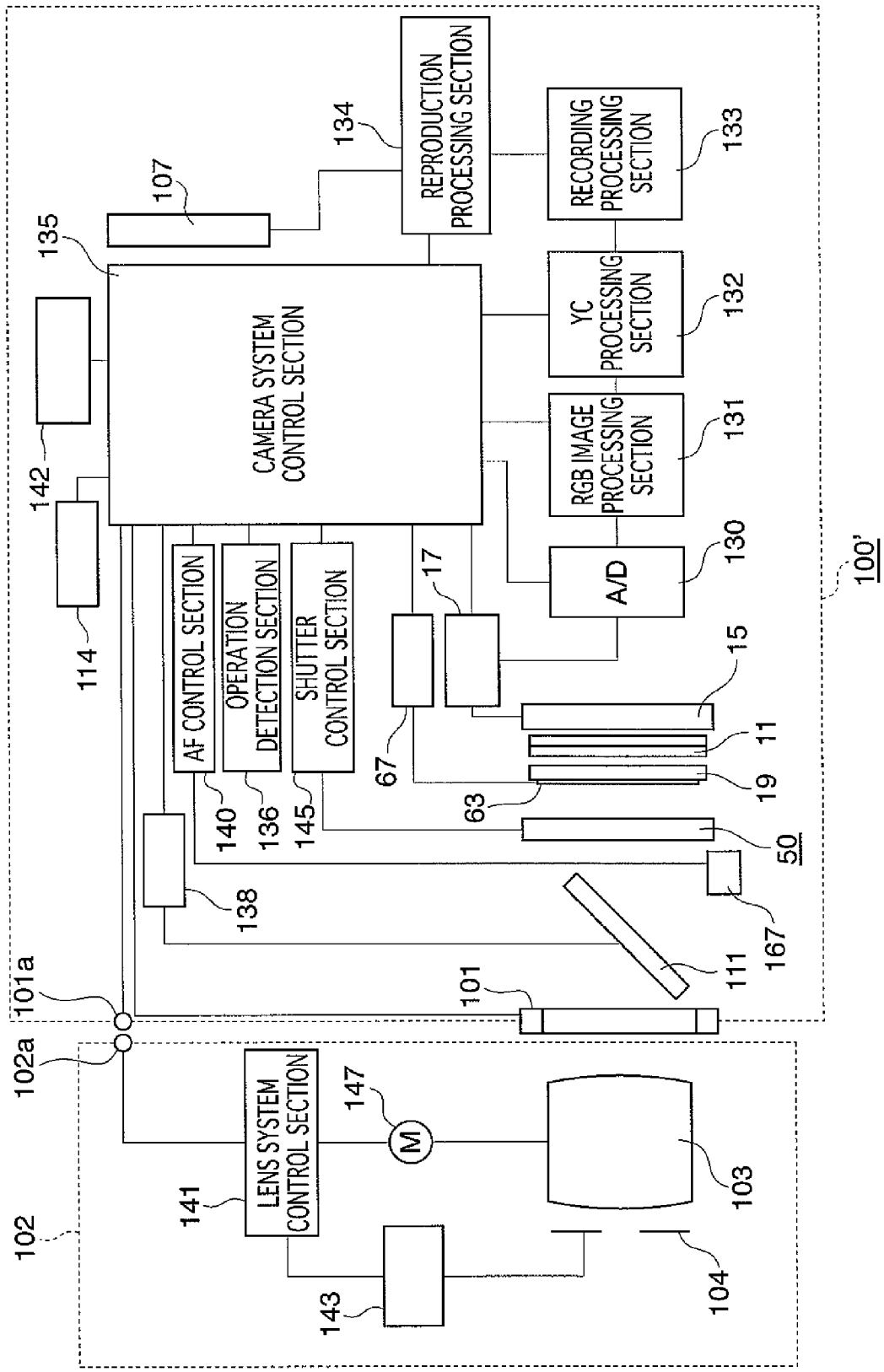
FIG. 18 is a block diagram showing the control configuration of the camera body in FIG. 15.

Next, the control configuration of the digital camera of this embodiment will be explained with reference to FIG. 18. FIG. 18 is a block diagram showing the control configuration of the camera body 100' in FIG. 15. Here, the basic configuration of the camera body which is applied to this embodiment is the same as the configuration in above FIG. 13. Therefore, this embodiment will explain parts which are different from those in the configuration in above FIG. 13. Furthermore, in FIG. 18, the same members as those in the configuration in FIG. 13 are assigned the same reference numerals.

The focus detection unit 121' detects an in-focus state of an image in the focus detection area provided at a predetermined position on the image-taking screen based on the reflected light from the sub mirror 122 at the focus detection section 167 and outputs a signal indicating this detection result.

A camera system control section 135 generates control signals individually for the respective sections such as the power circuit 67 of the camera body 100' based on the above described lens state signal, the detection signal from the operation detection section 136 and the signal from the AF control section 140 or the like. This control signal is a signal to instruct operation timing, operation contents or the like.

The power circuit 67 applies an AC voltage of a predetermined frequency (=frequency f of the surface acoustic wave) to the comb-shaped electrode 63 provided for the optical member 19 based on the control signal from the camera system control section 135 repeatedly on a periodical basis over a predetermined time period. This causes the surface acoustic wave to be excited on the surface of the optical member 19.

Next, a cleaning mode in this embodiment will be explained.

As described above, since the target area of sticking of dust which can lead to image shadows onto a captured image is the surface (incidence surface) of the optical member 19, the dust stuck to the surface of this optical member 19 is removed in the cleaning mode.

When switchover to a cleaning mode setting is performed according to the operation of the switch 123, the mode and the shooting condition or the like set immediately ahead thereof are stored. A control signal instructing the start of application of an AC voltage is then outputted from the camera system control section 135 to the power circuit 67 so as to start the cleaning mode.

The power circuit 67 starts the application of an AC voltage of a predetermined frequency to the comb-shaped electrode 63 on the optical member 19 based on the above described control signal. This causes a surface acoustic wave to be excited on the surface of the optical member 19. The application of the AC voltage is carried out repeatedly on a periodical basis for the predetermined time period, for example. This surface acoustic wave causes the dust stuck to the surface of the optical member 19 to be separated from the surface while moving on the surface and finally drop down to the lower part of the camera body 100'. That is, the dust stuck to the surface of the optical member 19 is removed from the surface.

Next, a control signal instructing to stop the application of the AC voltage from the camera system control section 135 is outputted to the power circuit 67 after a lapse of the predetermined time period. The power circuit 67 stops the application of the AC voltage to the comb-shaped electrode 63 based on the above described control signal. This causes the cleaning mode to end.

In this embodiment, as described above, the cleaning mode to remove the dust stuck to the surface of the optical member 19 is executed by operating the switch 123 at arbitrary timing. Instead of this, it is also possible to adopt such a sequence that applies an AC voltage to the comb-shaped electrode 63 of the optical member 19 when power to the digital camera is turned on or the end of the image-taking operation as a trigger.

As shown above, according to this embodiment, by causing a surface acoustic wave to be excited on the surface of the optical member 19, it is possible to easily remove dust stuck to the surface of the optical member 19. That is, even if dust which enters when lenses are replaced or the like or abrasion powder generated when the focal plane shutter 50 is driven or the like is stuck to the surface of the optical member 19, it is possible to remove the dust (or the abrasion powder) without touching the optical member 19. As a result, it is possible to provide a single-lens reflex digital camera capable of always taking an image of good image without imaging shadows of dust.

Furthermore, since the surface acoustic wave is generated only on the surface of the optical member 19, there is no possibility that the optical member 19 may be separated from the support plate 13. Furthermore, even when, for example, an infrared cut filter or the like is connected to the back of the optical member 19, the infrared cut filter is never detached due to the surface acoustic wave. In other words, if at least part (surface side) of the optical member 19 is made of a piezoelectric material, an optical member producing the above described effect can be provided.

Moreover, because the comb-shaped electrode 63 for exciting the surface acoustic wave is provided on the surface of the optical member 19, the thickness of the optical member 19 never increases considerably and the installation space of the optical member 19 can be easily reserved. As a result, the installation of the optical member 19 never causes the size of the camera body 100' to increase.

This embodiment has shown the case where the above described optical member 19 is composed of a crystal substrate having a thickness of 0.5 mm, but instead of this, it is also possible to make up the optical member 19 using other piezoelectric material. For example, the above described optical member 19 can be composed of lithium niobate ($LiNbO_3$) having a thickness of 0.3 mm. In this case, lithium niobate is $128\pi/180$(rad)Y cut with respect to the propagation surface of the surface acoustic wave. Furthermore, in this case, the electrode width d1 of the comb-shaped electrode 63 is set to 10 μm and the distance between the electrodes d2 is set to 30 μm.

When the optical member 19 is composed of this lithium niobate, because the propagation speed V of the surface acoustic wave is 4000 m/sec, the frequency f of the surface acoustic wave generated by the comb-shaped electrode 63 having the above described electrode width d1 and the distance between the electrodes d2 becomes 50 MHz according to above described Expression (1). Therefore, in the case of the optical member 19 having such a configuration, a 50 MHz AC voltage is applied to the comb-shaped electrode 63.

Furthermore, in this embodiment, the power circuit 67 is incorporated in the camera body 100', but instead of this, it is possible, for example, to adopt a configuration of providing an external power section corresponding to the power circuit 67 and connecting this to the camera body 100'. In this case, a terminal for connecting the above described external power section and the above described comb-shaped electrode 63 to the camera body 100' is provided. When the above described external power supply is connected to the above described terminal and an AC voltage is applied to the above described comb-shaped electrode 63 through the above described terminal, a cleaning mode for removing dust stuck to the surface of the optical member 19 is executed. When such a configuration is adopted, the power circuit 67 need not be incorporated in the camera body 100'.

Figure 19:
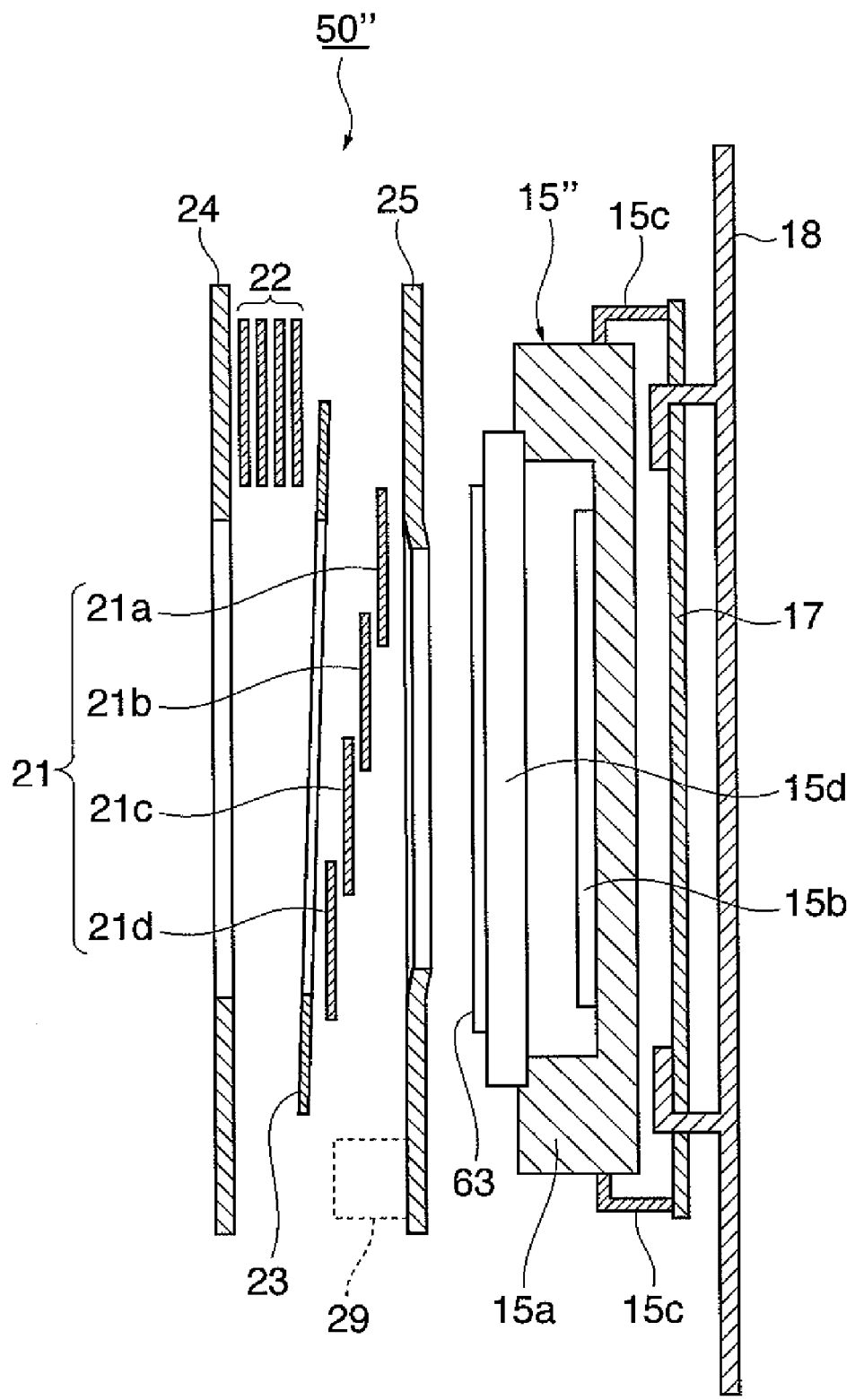
FIG. 19 is a longitudinal sectional view showing a variation of the configuration of the focal plane shutter and the periphery of the solid image-pickup apparatus in FIG. 16.

Next, a variation of the configuration of the focal plane shutter 50' and the periphery of the solid image-pickup apparatus 15' in FIG. 16 will be explained with reference to FIG. 19 and FIG. 20. FIG. 19 is a longitudinal sectional view showing a variation of the configuration of the focal plane shutter 50' and the periphery of the solid image-pickup apparatus 15' in the image-pickup apparatus in FIG. 16. The camera body applied to this variation here is a single-lens reflex digital camera and the basic configuration thereof is the same as the configuration of above described FIG. 16. Therefore, in this variation, parts different from the configuration in above described FIG. 16 will be explained. Furthermore, the same members as those in the configuration in above FIG. 16 are assigned the same reference numerals.

In this variation, as shown in FIG. 19, the optical filter 11' and the optical member 19 are not provided between a focal plane shutter 50" and a solid image-pickup apparatus 15" as in the case of the configuration in above described FIG. 16. In this case, dust is stuck to the surface of the cover member 15*d* of the solid image-pickup apparatus 15". Therefore, in this embodiment, the optical member 15*d* is provided with the comb-shaped electrode 63 which is shown in above described FIG. 16. Furthermore, in this case, it is preferable to constitute the optical member 15*d* using the piezoelectric material having a filter characteristic similar to that of the optical filter 11' in FIG. 16.

Figure 20:
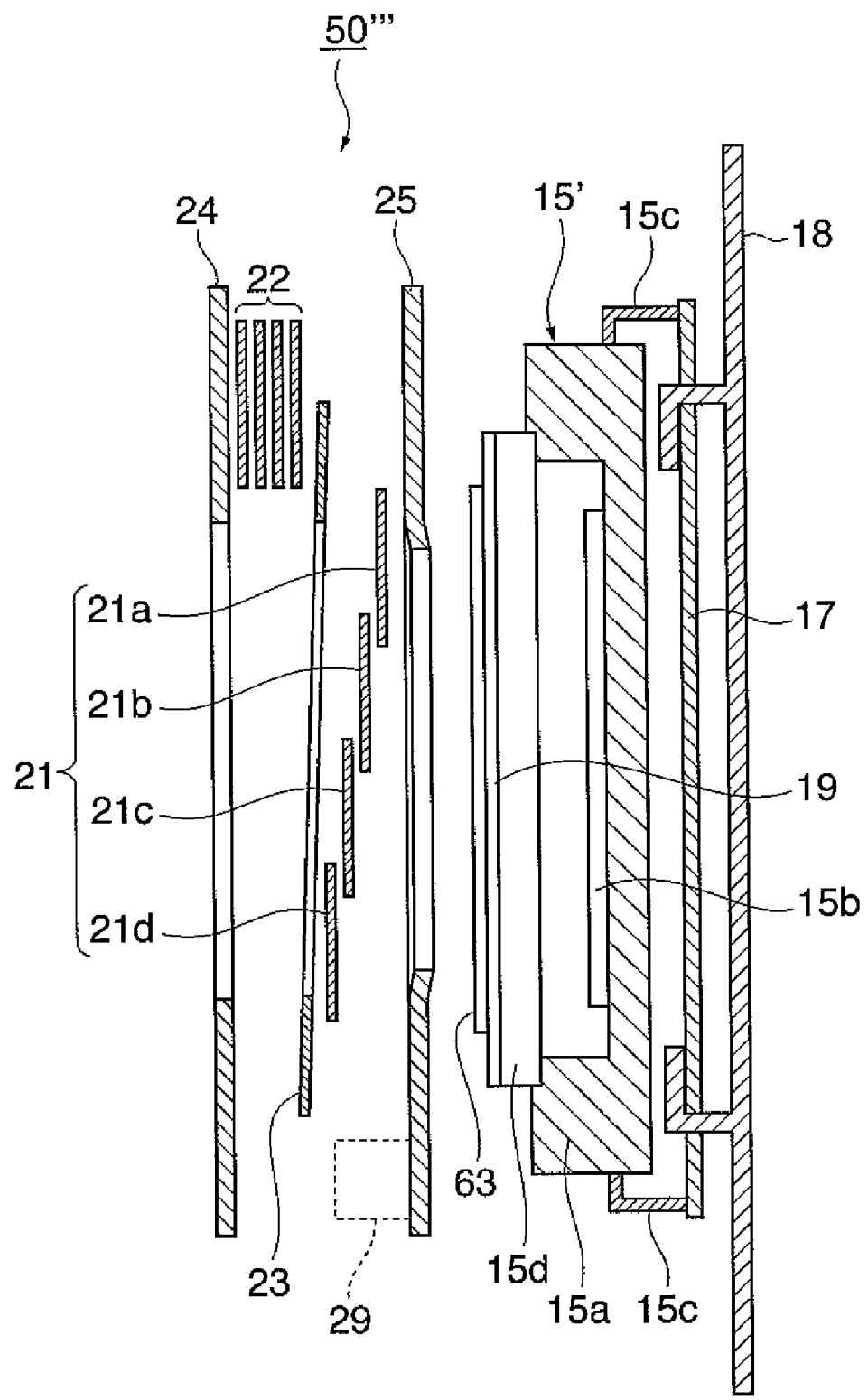
FIG. 20 is a longitudinal sectional view showing another variation of the focal plane shutter and the periphery of the solid image-pickup apparatus in FIG. 16.

Furthermore, instead of the above described configuration, the configuration as shown in FIG. 20 can also be adopted. That is, in the case of this configuration, the optical member 19 provided with the comb-shaped electrode 63 is pasted to the cover member 15*d* of the solid image-pickup apparatus 15'''. In this case, it is also preferable to constitute the optical member 19 using a piezoelectric material showing a filter characteristic similar to that of the optical filter 11' in above FIG. 16.

In this way, both configurations shown in above described FIG. 19 or FIG. 20 can obtain same effects as in the configuration in above described FIG. 16.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Applications Nos. 2006-108860 and 2006-108861 filed Apr. 11, 2006, which are hereby incorporated by reference herein in their entirety.

What is claimed is:

1. An image-pickup apparatus comprising:
    an image-pickup device adapted to convert light from an object to an electric signal;
    an optical member arranged in front of the image-pickup device at a distance from the image-pickup device;
    a sealing member adapted to block off a space formed between the image-pickup device and the optical member from outside;
    a surface acoustic wave exciting unit adapted to excite a surface acoustic wave on a surface of the optical member on an object side facing the object when an AC voltage of the predetermined frequency is applied thereto, the surface acoustic wave exciting unit being disposed at one end of the surface located outside of an area where the light from the object transmits into the optical member; and
    a restrain unit adapted to restrain an occurrence of a reflected wave of the surface acoustic wave, the restrain unit being disposed at the other opposing end of the surface with respect to the surface acoustic wave exciting unit, and the other opposing end being located outside of the area.

2. The image-pickup apparatus as claimed in claim 1, wherein the surface acoustic wave exciting unit has a first comb-shaped electrode and a second comb-shaped electrode, and the AC voltage of the predetermined frequency is applied between the first comb-shaped electrode and the second comb-shaped electrode.

3. The image-pickup apparatus as claimed in claim 1, further comprising an optical filter arranged in a space between the optical member and the image-pickup device blocked off from outside by the sealing member, adapted to have a predetermined cutoff wavelength.

4. The image-pickup apparatus as claimed in claim 1, wherein the optical member is made up of a piezoelectric member having a filter characteristic of limiting passage of a spatial frequency component in a predetermined band.

5. The image-pickup apparatus as claimed in claim 1, wherein the restrain unit is a vibration absorption member for absorbing the surface acoustic wave.

6. An image-pickup apparatus comprising:
    a substrate;
    a cover member adapted to cover the substrate to form a housing space blocked off from outside, the housing space being formed between the cover member and the substrate, and the cover member allowing light from an object to pass;
    an image-pickup element housed in the housing space and adapted to convert light which has passed through the cover member to an electric signal;
    a surface acoustic wave exciting unit adapted to excite a surface acoustic wave on a surface of the cover member on an object side facing the object when an AC voltage of the predetermined frequency is applied thereto, the surface acoustic wave exciting unit being disposed at one end of the surface located outside of an area where the light from the object transmits into the cover member; and
    a restrain unit adapted to restrain an occurrence of a reflected wave of the surface acoustic wave, the restrain unit being disposed at the other opposing end of the surface with respect to the surface acoustic wave exciting unit, and the other opposing end being located outside of the area.

7. The image-pickup apparatus as claimed in claim 6, wherein the surface acoustic wave exciting unit has a first comb-shaped electrode and a second comb-shaped electrode, and the AC voltage of the predetermined frequency is applied between the first comb-shaped electrode and the second comb-shaped electrode.

8. The image-pickup apparatus as claimed in claim 6, wherein the cover member is made up of a piezoelectric member which has a filter characteristic of limiting passage of a spatial frequency component in a predetermined band.

9. An image-pickup apparatus comprising:
    a substrate;
    a cover member adapted to cover the substrate to form a housing space blocked off from outside, the housing space being formed between the cover member and the substrate, and the cover member allowing light from an object to pass;

an image-pickup element housed in the housing space and adapted to convert light which has passed through the cover member to an electric signal;

an optical member pasted onto a surface of the cover member on an object side facing the object;

a surface acoustic wave exciting unit adapted to excite a surface acoustic wave on a surface of the optical member on the object side when an AC voltage of the predetermined frequency is applied thereto, the surface acoustic wave exciting unit being disposed at one end of the surface located outside of an area where the light from the object transmits into the optical member; and a restrain unit adapted to restrain an occurrence of a reflected wave of the surface acoustic wave, the restrain unit being disposed at the other opposing end of the surface of the optical member with respect to the surface acoustic wave exciting unit, and the other opposing end being located outside of the area.

10. The image-pickup apparatus as claimed in claim 9, wherein the surface acoustic wave exciting unit has a first comb-shaped electrode and a second comb-shaped electrode, and the AC voltage of the predetermined frequency is applied between the first comb-shaped electrode and the second comb-shaped electrode.

11. The image-pickup apparatus as claimed in claim 9, wherein the optical member is made of a piezoelectric member which has a filter characteristic of limiting passage of a spatial frequency component in a predetermined band.

* * * * *

UNITED STATES PATENT AND TRADEMARK OFFICE
CERTIFICATE OF CORRECTION

| | | |
|---|---|---|
| PATENT NO. | : 7,787,031 B2 | Page 1 of 1 |
| APPLICATION NO. | : 11/733313 | |
| DATED | : August 31, 2010 | |
| INVENTOR(S) | : Goro Noto et al. | |

It is certified that error appears in the above-identified patent and that said Letters Patent is hereby corrected as shown below:

On the Title page, Item (75)
Inventors field correct an error in the inventors as follows:

REMOVE: Yasushi Hozumi

Item (75) Inventors field correct an error in the inventors city of residence as follows:

Remove: Goro Noto, TOKYO

Insert -- Goro Noto, Ohta-Ku, Japan --

Signed and Sealed this

Thirtieth Day of November, 2010

David J. Kappos
*Director of the United States Patent and Trademark Office*